(12) United States Patent
Gausman

(10) Patent No.: US 10,565,177 B2
(45) Date of Patent: Feb. 18, 2020

(54) SOFTWARE DEFINED ENTITIES FOR DIGITAL SERVICE TRANSACTIONS

(71) Applicant: AT&T INTELLECTUAL PROPERTY I, L.P., Atlanta, GA (US)

(72) Inventor: Paul Gausman, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 417 days.

(21) Appl. No.: 15/350,584

(22) Filed: Nov. 14, 2016

(65) Prior Publication Data

US 2018/0137157 A1    May 17, 2018

(51) Int. Cl.
G06F 16/22    (2019.01)

(52) U.S. Cl.
CPC .............................. *G06F 16/2272* (2019.01)

(58) Field of Classification Search
CPC ....................... G06F 17/30336; G06F 16/2272
See application file for complete search history.

(56) References Cited

U.S. PATENT DOCUMENTS

| | | |
|---|---|---|
| 6,755,743 B1 | 6/2004 | Yamashita et al. |
| 7,181,017 B1 * | 2/2007 | Nagel ................... H04L 9/0825 380/282 |
| 7,500,916 B2 | 3/2009 | Lieberman et al. |
| 7,780,530 B2 | 8/2010 | Ushiro et al. |
| 8,052,520 B2 | 11/2011 | Park et al. |
| 8,253,743 B2 | 8/2012 | Lee et al. |
| 8,683,386 B2 | 3/2014 | Shuster et al. |
| 8,745,205 B2 | 6/2014 | Wipfel et al. |
| 8,793,378 B2 | 7/2014 | Allam et al. |
| 8,832,784 B2 | 9/2014 | Budko et al. |

(Continued)

FOREIGN PATENT DOCUMENTS

| | | |
|---|---|---|
| WO | 0135263 A2 | 5/2001 |
| WO | 2011160205 A1 | 12/2011 |

OTHER PUBLICATIONS

Batchelor, Simon, "Understanding Health Information Seeking from an Actor-Centric Perspective", International Journal of Environmental Research and Public Health, www.mdpi.com/journal/ijerph, 8103-8124, 2015.

(Continued)

*Primary Examiner* — Loc Tran

(74) *Attorney, Agent, or Firm* — Guntin & Gust, PLC; Jay Anderson

(57) ABSTRACT

Aspects of the subject disclosure may include, for example, determining a differentiating information item, and modifying a standardized digital index based on the differentiating information item to obtain an entity. The standardized digital index includes a number of data fields that accommodate a number of differentiating information items according to a standardized taxonomic structure. The number of data fields includes a topic label, a resource and a manifest listing that identifies the resource. The entity is stored in an entity repository, wherein the entity is accessible to support a digital transaction within a network service provider ecosystem comprising a plurality of differentiated network services, and wherein the entity supports the digital transaction as one of a user, a consumer, a producer, content, capabilities and any combination thereof. Other embodiments are disclosed.

20 Claims, 15 Drawing Sheets

(56) References Cited

U.S. PATENT DOCUMENTS

| | | |
|---|---|---|
| 8,924,549 B2 | 12/2014 | Raleigh |
| 8,931,064 B2 | 1/2015 | Barbir |
| 9,672,281 B1* | 6/2017 | Kapoor ............. G06F 17/30507 |
| 2002/0062300 A1 | 5/2002 | Asadov et al. |
| 2004/0143852 A1 | 7/2004 | Meyers et al. |
| 2008/0004118 A1 | 1/2008 | Van Luchene et al. |
| 2009/0181774 A1 | 7/2009 | Ratcliff et al. |
| 2010/0029382 A1 | 2/2010 | Cao et al. |
| 2010/0114662 A1 | 5/2010 | Jung et al. |
| 2012/0143863 A1 | 6/2012 | Tran et al. |
| 2013/0219001 A1 | 8/2013 | Velusamy et al. |
| 2014/0101032 A1 | 4/2014 | Farhat et al. |
| 2014/0164474 A1 | 6/2014 | Issa et al. |
| 2014/0172567 A1 | 6/2014 | Manoogian et al. |
| 2015/0012467 A1 | 1/2015 | Greystoke et al. |
| 2015/0019241 A1 | 1/2015 | Bennett et al. |
| 2015/0026785 A1 | 1/2015 | Soon-Shiong |
| 2015/0328546 A1 | 11/2015 | Xu |
| 2017/0046437 A1* | 2/2017 | Desineni ............. G06F 16/9535 |

OTHER PUBLICATIONS

Kavakli, Manolya, "A People-Centric Framework for Mobile Augmented Reality Systems (MARS) Design: ArcHIVE 4Any", Human-centric Computing and Information Sciences 5.1 (2015): 1., 2015, 1-22.

Lusch, Roberr F. et al., "Service Innovation: A Service-Dominant Logic Perspective", MIS Quarterly vol. 39 No. 1, Mar. 2015, 155-176.

Scarlat, Emil et al., "Knowledge Management for Virtual Reality Applications in a Home Rehabilitation Virtual Network", The Electronic Journal of Knowledge Management vol. 5 Issue 4, www.ejkm.com, 2007, 447-486.

* cited by examiner

200

300

Actor-1 requests Topic-C from Actor-2, which includes the nested Topic-E from Actor-4

600

700

800

900

1100

SOFTWARE DEFINED ENTITIES FOR DIGITAL SERVICE TRANSACTIONS

FIELD OF THE DISCLOSURE

The subject disclosure relates to software defined entities for digital service transactions.

BACKGROUND

Service providers of different digital network service ecosystems generally present self-contained service microcosms within which services and/or content are advertised, ordered, provisioned, provided, consumed, etc. Each service provider operates within a scope of their respective service microcosm, that may impose certain barriers to transactions between and/or among different service providers, and/or transactions between/among different services of any given service provider. Such constraints generally narrow the scope of service function usefulness and reusability, and reinforce a fragmentation of the service environment. Likewise, identity and/or security rules, parameters and/or technologies are typically fragmented across service boundaries.

Human users engaging in transactions within such ecosystems, e.g., as consumers of content and/or services, are typically represented as service-specific account records and active client application logins. Consequently, consumers involved with a particular service only exists temporarily and in a limited context of that service. Information about the consumer or user is limited to the information that exists within the scope of the service and during transaction intervals.

BRIEF DESCRIPTION OF THE DRAWINGS

Reference will now be made to the accompanying drawings, which are not necessarily drawn to scale, and wherein.

DETAILED DESCRIPTION

Figure 1:
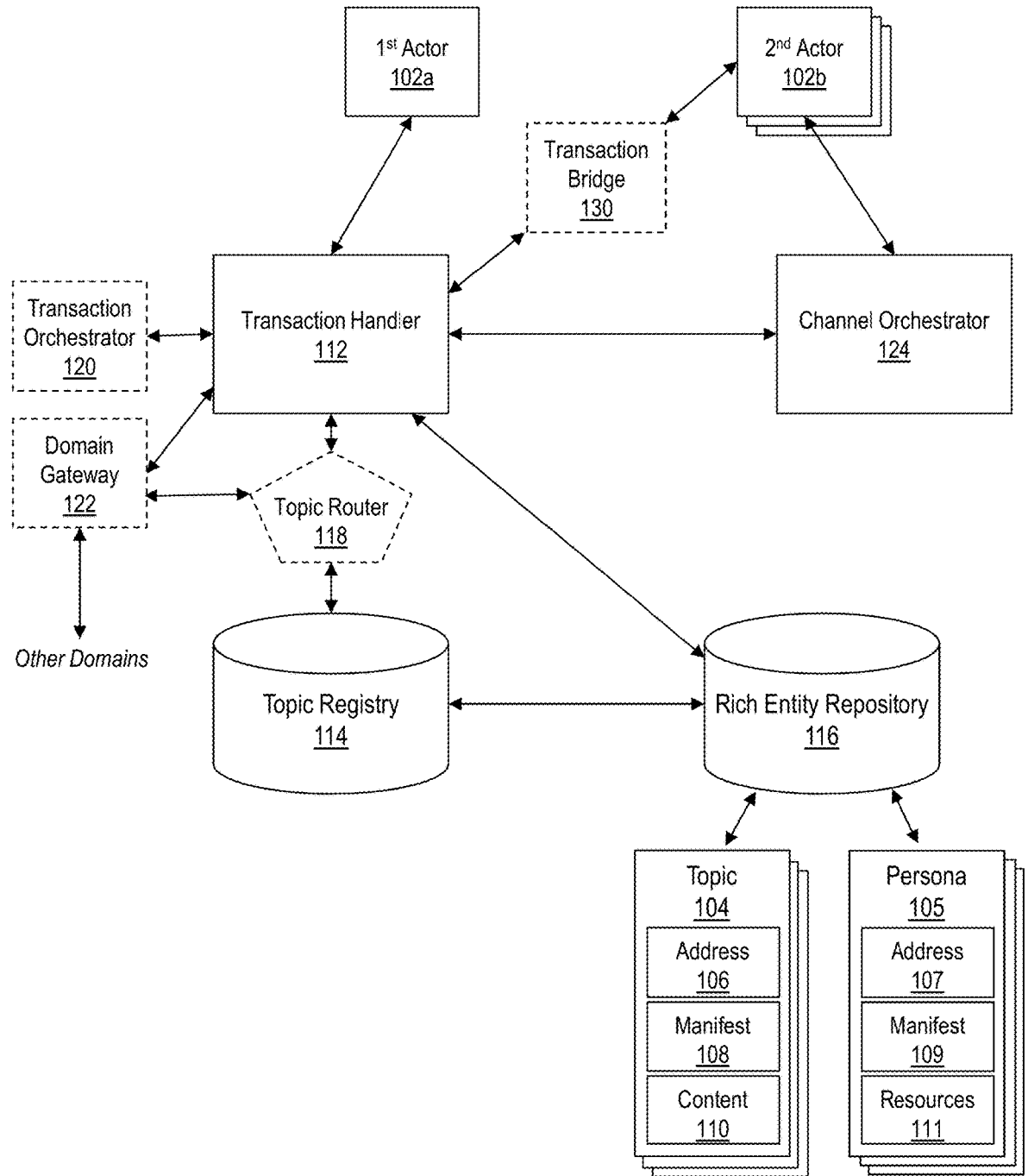
FIG. 1 depicts an illustrative embodiment of a network services ecosystem.

The subject disclosure describes, among other things, illustrative embodiments for an Actor Centric Service (ACS) paradigm, e.g., as part of an ACS digital ecosystem, that includes a comprehensive digital network service environment within which participating actors are digitally represented and capable of engagement in transactions with other actors, service functions and/or processes, based on a relatively uniform digital collection of information about each actor, referred to herein as an "entity" or a "rich entity."

Generally speaking, the entities include structured sets of data and/or metadata that describe actors (e.g., a person, a company, a service or product, and/or a process). The rich entities include information about and/or related to one or more of identities, content, resources, rules, preferences, and the like. Rich entities, e.g., as data schema, can provide semantic alignment across one or more applications, service providers, digital service ecosystems, and the like. Such semantic alignment can facilitate transactions between two or more actors as consumers and/or providers, e.g., in relation to various resources and/or content. The entities can be based on object data structures that become "entities" when associated with a differentiating feature.

The actors engaging in transactions can be associated with entities, e.g., represented by actor entities. Likewise, the subject matter of a transaction can be associated with entities, e.g., represented by topic entities, in which the topics relate to content, and/or processes including, in at least some instances, one or more processes that enable the ACS to facilitate such transactions.

The entities, as data structures that include differentiating features, can be stored in one or more entity registries. The entities allow for a representation of actors, content and/or resources or processes in a digital domain, in a consistent and predictable manner that transcends any specific application, service provider, ecosystem, and the like. Having all entities, including actors, resources, processes and the like, represented in a consistent manner, facilitates a processing of transactions in a uniform and consistent manner, based on information obtained in the entity capsule structures.

One or more aspects of the subject disclosure include a process that identifies a standardized digital index including a number of data fields that accommodate a number of differentiating features according to a standardized taxonomic structure. The number of data fields includes a topic label data field, a resource data field and a manifest data field that identifies a resource of the resource data field. A differentiating feature is identified and a standardized digital index is modified based on the differentiating feature to obtain an entity capsule. The entity capsule is stored in an entity repository, wherein the entity capsule is accessible to support a digital transaction within a network service provider ecosystem comprising a number of differentiated network services. The entity capsule supports the digital transaction as one of a user, a consumer, a producer, content, capabilities and any combination thereof.

One or more aspects of the subject disclosure include a device, including a processing system including a processor and a memory that stores executable instructions. The instructions, when executed by the processing system, facilitate performance of operations, including identifying number of differentiating features according to a standardized taxonomic structure. The number of data fields include a topic label data field, a resource data field and a manifest listing that identifies a resource of the resource data field. A differentiating information item is determined and the standardized data object is modified based on the differentiating information item to obtain an entity object. The entity object is stored in an entity repository, wherein the entity object is accessible to support a digital transaction within a network service provider ecosystem comprising a number of differentiated network services. The entity object supports the digital transaction as one of a user, a consumer, a producer, content, capabilities and any combination thereof. In at least some embodiments, a resource indexed by the resource data field can be selected from a group consisting of, but not limited to, histories, subscriptions, owned content, capabilities and any combination thereof.

One or more aspects of the subject disclosure include a machine-readable storage medium, that includes executable instructions that, when executed by a processing system including a processor, facilitate performance of operations. The operations include determining a differentiating information item, and modifying a standardized digital index based on the differentiating information item to obtain an entity. The standardized digital index includes a number of data fields that accommodate a number of differentiating information items according to a standardized taxonomic structure. The number of data fields include a topic label, a resource and a manifest listing that identifies the resource. The entity is stored in an entity repository, wherein the entity is accessible to support a digital transaction within a network service provider ecosystem comprising a plurality of differentiated network services, and wherein the entity supports the digital transaction as one of a user, a consumer, a producer, content, capabilities and any combination thereof.

This application is related to the following commonly-owned U.S. patent application filed on even date herewith and incorporated herein by reference in its entirety: Ser. No. 15/350,674, entitled "Actor Oriented Architecture for Digital Service Transactions."

An ACS ecosystem can include a compliment of service functions and APIs that are built upon an Actor Oriented Architecture (AOA) and aligned with an ACS paradigm, e.g., embodied in an ACS ecosystem. The ACS ecosystem includes service functions that enable digital actors representing consumers and/or providers in the ecosystem to engage in service transactions, including various service functions upon which all networked services are based.

Transactions according to the ACS paradigm can be said to occur between consumers and providers. A consumer is an actor represented as a digital entity that seeks, requests and/or takes content from another actor, also represented as a digital entity. In at least some embodiments, a consumer can display one or more behaviors as an interest, an intent, an inquiry, a request, a purchase and receiving as regards content of any type. A provider is an actor represented as a digital entity that is sought, requested and/or giving content to another actor, represented as a digital entity. A producer may display such behaviors as announcing, advertising, accepting requests, selling and transmitting as regards content of any type. This provider can include its own processing for fulfilling a request or employ an external process provider.

A process provider includes an entity that provides processing services for general use. In most cases, such a provider is a middleman in a larger, more complex transaction involving a processing of a request from a consumer, a processing of output from another provider, or some combination of both. An AOA function represents a particular type of entity, such as a process provider entity, that provides functionality within an ACS system.

By way of illustrative example, a consumer requests a search provider to locate one or more sources of a content item, after which the consumer would place a request to the content provider for access to the content. A consumer can request the content from a content aggregator, which acts as a producer or reseller for the content owner. When a consumer requests content in a specific form that is not readily available to a content provider, the content provider, in turn, can become a consumer by engaging in another transaction to employ another content conversion process provider to translate the content into the required form before delivering the content to the consumer. This is an example of a chained transaction, in which satisfaction of one transaction between the consumer and the content provider requires satisfaction of another linked transaction between the content provider and the content conversion process provider.

Any actor involved in any service transaction represents an entity capable of assuming standard service roles. The actors are available to engage any process, application or service function, which is itself an actor represented by a "rich entity," in the setting of a transaction which is aware of Actor-Oriented methodologies, i.e., "actor aware." Information that is part of each entity, e.g., insight, metadata, rules and capabilities, are available to, and have value in a context of, any transaction between that entity and one or more other entities. Additionally, the identity and security rules and parameters set within an entity make identity and security issues ubiquitously applicable, simpler to manage and easier to enforce.

Benefits of an ACS ecosystem include, without limitation, user experiences that are developed as one unified application, with blended services as sub-functions. The ACS ecosystem alleviates data and function redundancy, resulting in development and operations that are simpler and less costly. Product developers can focus on creating rich and novel user experiences without being bogged down in technical issues. This frees the exercise of product definition from the restrictions imposed by legacy service isolation.

FIG. 1 depicts a schematic representation of a system employing an actor-oriented architecture 100 according to the ACS ecosystem. Actors 102a, 102b, generally 102, engage topics 104 in one or more transactions that involve content and/or resources 110. The transactions can be facilitated by one or more service functions and/or other processes, e.g., through Application Programming Interfaces (APIs) to drive activity that supports execution of the transactions.

An actor corresponds to a physical or logical instance of an entity, to which a rich entity (RE) is associated. The RE can include a data structure that can be thought of as a container or capsule that stores information, e.g., metadata that facilitates transactions between actors according to the ACS paradigm. Actors are participants engaged in a transaction within the AOA. Actors 102 can be any person, place, thing or idea (i.e., noun) that participates in transactions. It is understood that actors can include inanimate objects, e.g., according to Internet of Things (IoT) scenarios. Without limitation, the various examples disclosed herein relate to digital network service transactions in which the actors include digital service providers, digital service subscribers, process providers, and the like. Content can include digital media, such as audio, video, still images, text, file transfer, gaming, commerce, advertising, indicia of goods and services, and the like. It is understood that the various systems, architectures, processes and techniques disclosed herein can be applied to virtually any application capable of being represented or otherwise facilitated in a digital domain.

Actors 102 can include real world things like people, companies, parts, media assets, network interfaces, services, etc., or digital things like programs, enablers, services, customers, processes, web pages, etc. To participate in digital networked services, every type of actor is represented by a digital object (i.e. "object"). Objects are generic and non-specific, and typically can be viewed as templates for types of entities. A rich entity, or simply an entity, is a specific object with differentiating characteristics. Any object can become an entity by the assignment and inclusion of these differentiating characteristics.

Generally speaking, every participating "thing" in the AOA can be represented as an entity. Entities are comprised of one or more of the following: identities, security, metadata, resources and rules for execution of inbound and outbound transactions, indexes to information, including digital content, that may be stored within the entity and/or elsewhere. Among the resources of an entity are its capabilities and its information. The inherent capabilities of an entity can include one or more of: accepting and processing requests for a transaction; formulating and making requests for a transaction; assuming and managing its identities; enforcing and managing its security rules; accessing its metadata and other information; and engaging external capability and/or information resources to which the entity has access and permissions.

Entities can include topics entities 104 and/or persona 105. The topic entities 104 can include address information 106, a manifest 108 and content 110. The address information 106 can include a topic label and/or an address by which the topic entity 104 can be accessed, e.g., a uniform resource name (URN). In some embodiments, the manifest 108 includes a manifest file. The manifest file 108 identifies or otherwise maps out information contained within the topic entity 104. The manifest file 108 allows the topic entity 104 to expose its content 110. Namely, the manifest file 108 maps out and/or otherwise points to all information within the topic entity 104, that a creator of the topic entity 104 has chosen to expose or otherwise make accessible to transactions according to an ACS paradigm. A data structure of the topic entity 104 can be referred to as a capsule. Any of the various data structures disclosed herein can include, without limitation, XML schema, arrays, linked lists, records, classes, graph data structures, and the like.

Likewise, the persona entities 105 can include address information 107, a manifest 109 and resource(s) 111. The address information 107 can include a persona label and/or an address by which the persona entity 105 can be accessed, e.g., a uniform resource name (URN). In some embodiments, the manifest 109 includes a manifest file. The resource(s) 111 can include a branch of the capsule structure that holds the entity's resource catalog, e.g., including all resource information for the entity. Resource information can include any and all information pertaining to available resources, e.g., histories, subscriptions, owned content, capabilities, etc. The resource catalog 111 can be in the form of actual data and/or redirection to information available elsewhere (e.g., a topic label.) For legacy compatibility, the resource catalog 111 information can take the form of addresses to legacy resources. Information referenced in the resource catalog 111 can be considered public, but can also be subject to entity access restrictions and/or usage rules as might be imposed.

The manifest file 109 identifies or otherwise maps out information contained within the persona entity 105. The manifest file 109 allows an owner, by way of the persona entity 105, to selectively expose its resource(s) 111. Namely, the manifest file 109 maps out and/or otherwise points to information within the owner's persona entity 105. It is understood that an owner can have one or more personas at any given time, and that information, e.g., addresses 107 and/or resources 111, can be selectively exposed or otherwise made available for participation in transactions according to the ACS paradigm. Topics 104 and/or personas 105 can be stored within a common rich entity, e.g., within a rich entity repository 116. For example, an owner can be allocated a single rich entity capsule through which the owner can use, manage or otherwise access one or more personas and/or topics at any given time. Alternatively, or in addition, it is understood that an owner can have more than one rich entity capsules that can be used to organize, manage or otherwise access their personas and/or topics.

Certain roles can be attributed to information within rich entities 104, 105. For example, all information becomes content when it is the focus of some kind of consumption. Likewise, all information becomes metadata when it is about other information. Metadata can become meta-content, e.g., when it is consumed in support of the content it is about. Alternatively or in addition, objects and/or entities can be associated with processes, which are called capabilities. Moreover, any entity can be nested as a topic within other entity's resource catalog. When a topic is nested within another entity's resource catalog, the identity and security rules and parameters associated with the nested topic apply Primary to an object becoming an entity is an addition of a unique identifier, or topic, to a taxonomic structure of information, or capsule, defining that specific entity. This structured information includes identity and security information, and a "resource catalog" containing pointers to resources available to the entity. Resources listed in the resource catalog of an entity can include owned or subscribed entities of any type. The foregoing information collectively can be said to define the entity.

Any entity 104, 105 can include as content 110, 111 digital media assets, such as movies, music, images, physical assets such as DVDs, merchandise, print publications, or any other type of assets such as possessions, money, family members, which instantiate some aspect of the entity in some way. An asset can be associated with an entity as a resource, referenced by the entity's manifest. Each asset is itself an entity.

By use of entities, an ACS ecosystem supports a service ecosystem in which any actor is capable of assuming the roles of consumer or producer, and of entering transactions with any entity such as person, thing, process, application or service function) that is entity aware.

The system 100 includes a transaction handler 112, e.g., a processing entity according to the ACS paradigm, that facilitates transactions between one or more actors, e.g., between the first actor 102a and the second actor 102b, according to the ACS paradigm. The actors 102 are digital entities that can be representative of real entities, e.g., owners, including physical entities such as persons, places, things, abstract entities, such as ideas, and the like, i.e., a noun. In a service provider context, the entities can represent one or more of service providers, subscribers and third party entities.

In some embodiments, the system 100 includes a channel orchestrator 124 that facilitates establishment of one or more channels between one or more entities by which content passes from one actor 102b to another 102a. In at least some embodiments, the manifest file 108 can include rules for a transaction handler 112 to abide by when interacting with a channel established by the channel orchestrator 124 in relation to a particular request. In general, a channel is a collection of topics and personas addressed through one identifier (or address as the identifier) and optionally governed by some common channel rules. A channel is primarily a topic entity but can support generic interactivity. Channels can be nested in other channels, personas or topics.

By way of non-limiting example, potential service provider entities can include one or more of: a monetization entity; a recommendation entity; a translation entity; a personal user agent entity; a transaction encryption entity; a digital rights management (DRM) configuration entity; a DRM enforcement entity; an advertising network entity; a device intelligence entity; a user experience (UX) synchronization entity, and so on.

The system 100 further includes a topic registry 114. The topic registry 114 itself can be a processing entity according to the ACS paradigm, e.g., having an associated topic 104 identified within an entity capsule within the rich entity repository 116 that can be accessed by its published topic addresses 106, just like any other topic. The topic registry 114 serves as a resource for the transaction handler 112 to identify or otherwise provide an address by which resources of a topic 104 can be accessed. In at least some embodiments, the topic registry 114 can include a database of published topic addresses 106.

Personas 105 can include some or all the potential characteristics and capabilities of an actor 102, e.g., including one or more resources 111 to respond to transaction requests and to originate transaction requests, particularly to information resources such as foreign topic registries (not shown). In a context of a transaction, a persona can be implied or otherwise identified by association with an initiator of the request. For example, the transaction handler 112 receives a request from an actor having an associated persona. It is understood that in at least some instances, a persona of an entity that responds to a transaction request can be identified within a topic subject to the request. For example, a topic 104 can include indicia of a personal 105, such as a pointer to a persona 105 that can be applied or otherwise referenced in association with the transaction.

In at least some embodiments, the topic registries 114 can be clustered in a hierarchical configuration. This includes support of division of topics by classes, alpha sort and/or any other scheme, representing each division by different topic registries, to help in topic organization, speed of topic request turnaround and/or load dispersion.

Rich entities of the rich entity repository 116 contain information about entities' identities, security, authenticity, attributes and capabilities. All aspects of any type of actor are represented in the form of a rich entity that can be provided in standardized structures and formats. In at least some embodiments, the standardized structures and formats are understandable to both human and machine. The standardized structures and formats rationalize, unify and standardize service and customer resources, which reside in various service platforms, e.g., across different and even competing service providers.

The rich entity capsules provide a standardized definition or structure for digital entities and/or for one or more of topics, persona, content, metadata, resources and/or capabilities, which make up or are otherwise associated with a digital entity. In at least some embodiments, the capsules or structures can include graph-based databases and/or so called, "big data" solutions. The rich entity capsules can be determined according to schema and/or formats, e.g., that include one or more of a web ontology language (OWL), a resource description framework (RDF) and an extensible markup language (XML).

In at least some embodiments, the system 100 optionally includes a topic router entity 118 (shown in phantom). The topic router 118 can be implemented as a functional entity according to the ACS paradigm that includes an ability to find a topic. In particular, the topic router entity 118 can associate a request for a topic to a relevant topic without a specific label. This supports a content centric networking scenario, in which content is located and exchanged over a network based on an identity of the content, and not necessarily a location. Such content centric networking effectively removes location as a requirement for content validation for situations in which the content is self-validating or can provide content at varying levels of assurance as appropriate.

In at least some embodiments, the system 100 optionally includes a transaction orchestrator entity 120 (shown in phantom). The transaction orchestrator entity 120 can be implemented as a function entity according to the ACS paradigm that includes an ability to perform one or more of sequencing of complex transactions, tracking of transaction status, and particularly complex transaction status, and recovering from failures. In some embodiments, the transaction orchestrator 120 can be accessed by one or more of the actors 102 as a resource. Alternatively or in addition, the transaction orchestrator 120 can serve as an independent function.

In at least some embodiments, the system 100 optionally includes a domain gateway entity 122 (shown in phantom). The domain gateway entity 122 manages and/or controls traffic between different domains. The domain gateway entity 122 can facilitate one or more of authentication, authorization and accounting (AAA) and other security and identity related functions.

By way of non-limiting example, the network services ecosystem 100 can include one or more other network functions alone or in combination. Namely, in addition to the above examples, the following is a list of typical network functions that can be instantiated alone or in combination as functional entities according to an ACS paradigm, including: an event/message broker; a service broker; a load balancer; and any software-defined networking (SDN) function.

Inter-entity transactions are the interaction of two or more entities, and are the dominant type of transaction in the ARL. These transactions can operate in several modes that include one or more of built-in modes of interaction and assisted entity interaction modes.

Built-in modes of interaction include one or more of multipoint peering mesh, class broadcasting, aggregate entity multicasting, built-in bridging and mesh modes of any of the foregoing built-in modes. In a multi-point peering mesh transaction, each entity in a multi-entity complex transaction set maintains and services a separate transaction connection between themselves and all other necessary entities. In class broadcasting transactions, an entity broadcasts a consumption request to a class entity that passes the request on to all known entities that are part of that class. In aggregate entity multicast transactions, a group of entities can be aggregated into a new entity (e.g., employees grouped into a company) and any entity could access the body of included entities via the group entity topic. In built-in bridging transactions, entities are configured with bridging capabilities so that they can engage that bridging capability inherently, to tie multiple other entities together for transaction purposes. In mesh transaction modes, one or more of the foregoing built-in modes can be employed in combinations as required to support a complex transaction set.

In at least some embodiments, the system 100 optionally includes a transaction bridge entity 130 (shown in phantom). The transaction bridge entity 130 can be implemented as a functional entity according to an ACS paradigm that includes an ability to connect more than two entities to enable one or more of various modes, e.g., including one to many, many to one and/or many to many transactions. It is understood that each of these modes can have a specific type of transaction bridge entity 130 based on specialized requirements of each mode.

It is understood that one or more of the system entities, such as the transaction handler entity 112, the rich entity repository 116, the channel orchestrator entity 124, the topic registry entity 114, the transaction orchestrator entity 120, the domain gateway entity 112, the topic router entity 118, and the transaction bridge entities 130, e.g., as functional entities of an ACS ecosystem, can be represented by corresponding rich entity capsules within the rich entity repository 116.

Assisted entity interaction modes include bridged transactions and proxy transactions. In bridged transactions, each entity transacts with a bridging network function entity in a one-to-one fashion, and the bridge entity controls the switching of transaction connection as appropriate. In proxy transactions an entity could hand off a transaction job to an authorized proxy network function entity that could carry out one or more transactions as needed to fulfill the request of the initial entity.

Inter-entity transactions can operate in a private network or a public network setting, with or without exposure layer, i.e., API gateway and router, and integration layer, i.e., middleware.

Intra-entity transactions can operate between an entity and itself, e.g., self-administration, editing owned metadata, rules configuration. Intra-entity transactions typically use resource capabilities to assist these transactions.

Figure 2:
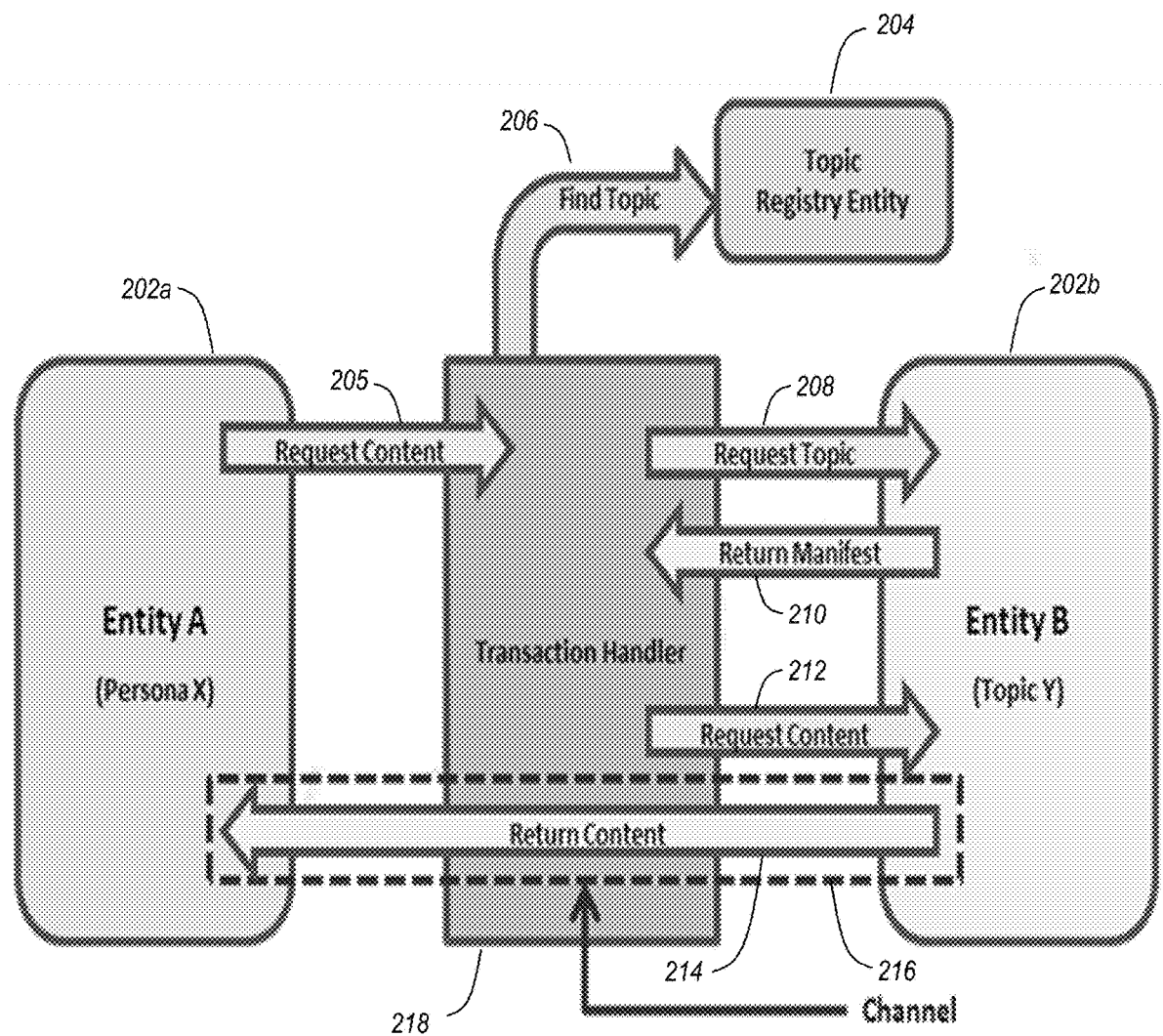
FIG. 2 depicts an illustrative embodiment of a transaction between entities of the network services ecosystem of FIG. 1.

FIG. 2 depicts an illustrative embodiment of actors as ACS entities engaging in a transaction 200 between entities of the example network services ecosystem 100 of FIG. 1. The example transaction 200 involves a first actor as a requester or consumer entity, e.g., Entity_A 202*a*, a second actor as a supplier or provider entity, e.g., Entity_B 202*b*, a transaction handler entity 218 and a topic registry entity 204. It is understood that in at least some embodiments, all of the entities 202*a*, 202*b*, 218 and 204 have corresponding rich entity structures, e.g., entity capsules, that can be stored and/or otherwise accessed through a rich entity repository 116 (FIG. 1).

At a high level, an individual, i.e., an actor as a consumer, seeks content, such as media content and/or services, for consumption. The individual actor in this example engages Entity_A 202*a* in a form of Persona X. Persona X can correspond to a "root persona" that may have been established beforehand, e.g., during the individual or owner's subscription to a service of a traditional service provider that participates in the ACS ecosystem, or to an individual subscription to an ACS service. A root persona can be consider as an "outbound identifier" in that it is an identifier of an entity, i.e., a persona, that initiates a request to be fulfilled by the transaction handler 281. The individual's Persona X places a request 205 that identifies the requested content, e.g., a topic. The request 205 is forwarded to the transaction handler 218.

In at least some embodiments, a root persona and/or outbound identifier, such as Persona X of Entity_A 202*a*, has an associated transaction handler. For example, the transaction handler entity 218 is identified as a resource within a rich entity capsule of Entity_A 202*a*. Accordingly, any requests initiated via Entity_A 202*a* can use the corresponding resource to identify the transaction handler 218 as a participant in the transaction. It is conceivable that an ACS system can include more than one transaction handlers 218. For example, multiple services providers can provide their own respective transaction handler(s) 218 to service requests from their respective subscribers. According to the ACS architecture, any request can be serviced by any of the available transaction handlers. Alternatively or in addition, some implementations can include a single, e.g., central, transaction handler that supports all transactions. It is understood that in at least some embodiments, a requesting and/or providing entity's 202 rich entity capsule may not include or otherwise require an associated transaction handler.

Any information, which is given, transferred or otherwise shared from one entity to another can be referred to as content. An entity, e.g., Entity B 202, i.e., Topic Y, exposes, e.g., publishes, its available content in a manifest data item, such as a manifest file 109 (FIG. 1). The manifest file 109 includes one or more of an identification of the information, a description of the information and any capabilities 110, 111 (FIG. 1) that might be available from the entity 202. Entity_B 202*b* includes a "root topic," e.g., a "Topic Y" label that can be published in a topic registry 114 (FIG. 1). Publication can include identification of the root topic and an address and/or pointer to a corresponding topic entity stored in the rich entity repository 116 (FIG. 1). As the root topic can be used to service requests, it can be referred to as an "inbound identifier."

A master manifest file 108, 109 (FIG. 1) of an entity 202, e.g., as a topic and/or a persona, can include a comprehensive list of available information and capabilities of a provider entity, along with supported processes, functions, resources and/or methods. The master manifest file 108, 109 can be accessed via the entity's root identity 106, 107 (FIG. 1), which is also referred to as the entity's root topic. Alternatively or in addition, an entity 202 can publish a subset of information and capabilities as a limited manifest file as a topic entity 104. Such a topic entity 104, e.g., a sub-topic entity, is in itself a sub-entity of the parent entity. Such limited manifest files can simplify interpretation and application of manifest files by configuring the provider entity into a subset of relevant information and parameters. A sub-topic manifest file can be accessed using one of the entity's alternate identities, e.g., alias, persona, email address, etc., or the topic label specifically set for the sub-topic. Each identity and label acts as an address and points to the sub-entity defined in the topic manifest file.

Manifest files, e.g., the master manifest file and/or limited manifest files can be published or otherwise identified via an entry in the topic registry 204. These include manifest files of topics and/or manifest files of personas, e.g., as identified alone or in association with topics. In the illustrative embodiment, the requestor or consumer entity 202*a*, e.g., "Persona X" submits a transaction request 205 to the transaction handler 216. The transaction handler 216, in turn, identifies a requested topic from the transaction request 205 and submits an inquiry 206 to the topic registry entity 204 to find or otherwise locate a requested topic. For example, the requested topic can include or otherwise identify a particular movie, episode of a television series, broadcast and/or multicast program, and the like. The topic registry entity 204 includes an identity of one or more topics, such as Entity_B 202*b*, e.g., "Topic Y," which contain the requested content.

Having identified a provider entity, e.g., Topic Y 202*b* as a potential provider of the requested content, the transaction handler submits a topic request 208 to the provider entity 202*b*. In response to the request 208, the provider entity 202*b* returns a manifest file 210 to the transaction handler 216. The manifest file 108 (FIG. 1) exposes content and resources of the provider entity 202*b*, e.g., the requested topic. Having evaluated the manifest file 108, the transaction handler 218 submits a content request 212 for the particular content to the provider entity 202*b*, according to information provided in the manifest file 108. The provider entity 202*b*, returns the requested content 214. It is understood that a persona associated with Topic Y 202*b* can be identified, e.g., within the topic. A resource of the persona can be identified by an association contained within the manifest file 108 of Topic Y 202*b*.

At least some of the communications or messages exchanged between entities, e.g., provider entity 202*a*, transaction handler 218, topic registry 204 and provider entity 202*b* can be considered control or signaling messages, e.g., according to a control or signaling protocol, sometimes referred to as a control or signaling plane. Namely, requests for content 205, the finding a topic 206, requesting of the topic 208, the returning of the manifest 210 and the request for content 212 can be considered signaling messages. Other communications or messages that relate to an exchange of requested content, e.g., the return content 214, can be considered user or data messages of a user or data plane. In this regard, it is understood that although the return content 214 is illustrated as traversing the transaction handler 218, it is understood that such user plane data exchanges can occur between the entities 202*a*, 202*b*, without necessarily requiring the user plane data exchange to be routed through or otherwise communicated to the transaction handler 218.

In operation, the transaction handler 218 accepts and interprets requests that are received via the API(s) of the entity 202*a* and orchestrates their fulfillment. The transaction handler 218 applies appropriate security measures, creates and/or carries out requests to other entities 202*b*, or the same entity 202*a* for intra-entity transactions, accesses any manifest files related to a topic as needed, accesses any persona information (e.g., settings, rules) as needed, and/or acts as a proxy for the entity, including the ability to negotiate and initiate transactions with process and information providers that are not listed in the resource section of the capsule.

Transactions include intra-entity transactions and/or inter-entity transactions. Intra-entity transactions include transactions that involve one entity. Examples can include, without limitation, self-administration, editing owned metadata, configuration of rules and/or policies, and the like. Inter-entity transactions generally include transactions that involve two or more entities. It is understood that resource capabilities of the involved entities can be used to facilitate intra-entity and/or inter-entity transactions.

A nested topic can be associated with a transaction handler of a host topic and/or with a different transaction handler, e.g., set by an owner of the nested topic, as rules allow. Entities and topics can be nested by virtue of the resource mechanism in an entity. This can take the form of a class entity or topic with multiple class related entities/topics as its resources, as an aggregate entity or topic with multiple entities/topics as it resource but not necessarily related by class, or as any entity or topic with any combination of entities/topics in its resources (e.g., subscriptions, owned media, etc.).

A Nested entity or topic retains all the characteristics which they possess as an independent, non-nested entity or topic. Accessing a nested entity still requires the same identity and security rule enforcement.

A sub-topic of an entity can be nested within the resources of another entity or topic, simplifying the access and management of information related to the topic being used as resources in other entities or topics. A sub-topic can be a version of its parent entity, defined by a manifest file at a point in time. Because of this, an active channel which contains live content or which has a changeable manifest file does not inherently have persistence. To persist such a channel, the topic and manifest file, and all current content components at the selected time, would need to be preserved intact. To persist a channel containing live content and/or a changeable manifest file, the live content and active manifest file needs to be captured and stored, and the resulting entity given a new topic label indicating the original topic label and the context, which would then be associated with the preserved manifest and content, (e.g., recording live content and publishing it as on-demand content). The channel 216 can function to deliver streaming or on-demand media content, web content, documents, signals, messages, or any digital payload to be received by the consuming entity. The channel 216 can include signaling and signaling paths required to consume the channel 216. In general, a channel can support one-to-one, one-to-many, and/or many-to-many transactions of a real-time, non-real-time, interactive or non-interactive nature.

The version of a given manifest file is set by combining the topic label with a cardinal value which elevates each time the manifest file is changed, plus a date/time stamp if the content sources listed are variable.

Topics can be dynamically created and destroyed (or disabled) manually or in automated fashion. Manifest files can also be created and altered manually or in automated fashion. Destroying or disabling a topic allow for temporary entities and also the ability to turn an entity on and off. Changing a manifest file leaves the entity available for transactions but changes the definition of the channel associated with the topic.

Generally speaking, when an entity 202*a* consumes output from another entity 202*b*, that output can be considered content. In at least some embodiments, the manifest file 210 can include one or more references to rules for the transaction handler 218 to abide by when interacting with the channel 216 for a given request. A specific group of information being accessed as content is a content channel (i.e. "channel"). It is a sequence or sequences of topics and their metadata, and in the case of media content, includes the encoded media information. The unique identifier of a content channel is a topic.

The channel 216 includes appropriate entity content and capabilities. Rules for the transaction handler 218 to abide by when interacting with the channel 216 are defined in the manifest file 108 used for a given request. Exact channel contents only reliably exist for the duration of a transaction, but the topic which points to the channel resources can persist, e.g., as the set of APIs that call it. This is due to the fact that any version of a topic 104 is published and remains static, while the manifest file 108 associated with a topic can be changed at any time, and the resources or content 110 identified within the topic's manifest file 108 can also change their content outputs over time.

Activities that focus on consumption of content deal in terms of topics and channels. Activities that focus on consumers and providers of content deal in terms of actors and entities. Because of these properties of the AOA, it can be observed that all transactions involve content, and no service function of any commercial value can exist without the involvement of content.

The appropriateness of a given entity 202 regarding a specific transaction is reflected in context. Context includes affinities between the entity and other entities, and the content of the entity's active topic manifest File. Because of this, an entity can be engaged for transaction activity based on explicit selection by another entity or by implicit selection based on the available context information. In either case, if the selected entity does not support the type of transaction requested, the requested entity can reject the request.

Context is also reflected in the class hierarchy of the entities involved. Class position in the known hierarchy can be found in the manifest file 108, if included, or discovered using a topic registry 114 (FIG. 1) if class hierarchy is available from the topic registry. This class context information can also be used to find Entities within a specific class, e.g., request for Car Loan entities. Additional filters can be applied, e.g., filter for geographic location.

The juxtaposition of entities with their information and resources is clearly spelled out and provides readily accessible context for new and powerful insight information. The linkage of daisy-chained entities engaged in any transaction (e.g., the primary entities and all the sub-topics/entities engaged from each of the primary entity resources) can be plainly recorded in transaction histories and logs, which describes social affinities between participating entities in a transaction.

Figure 3:
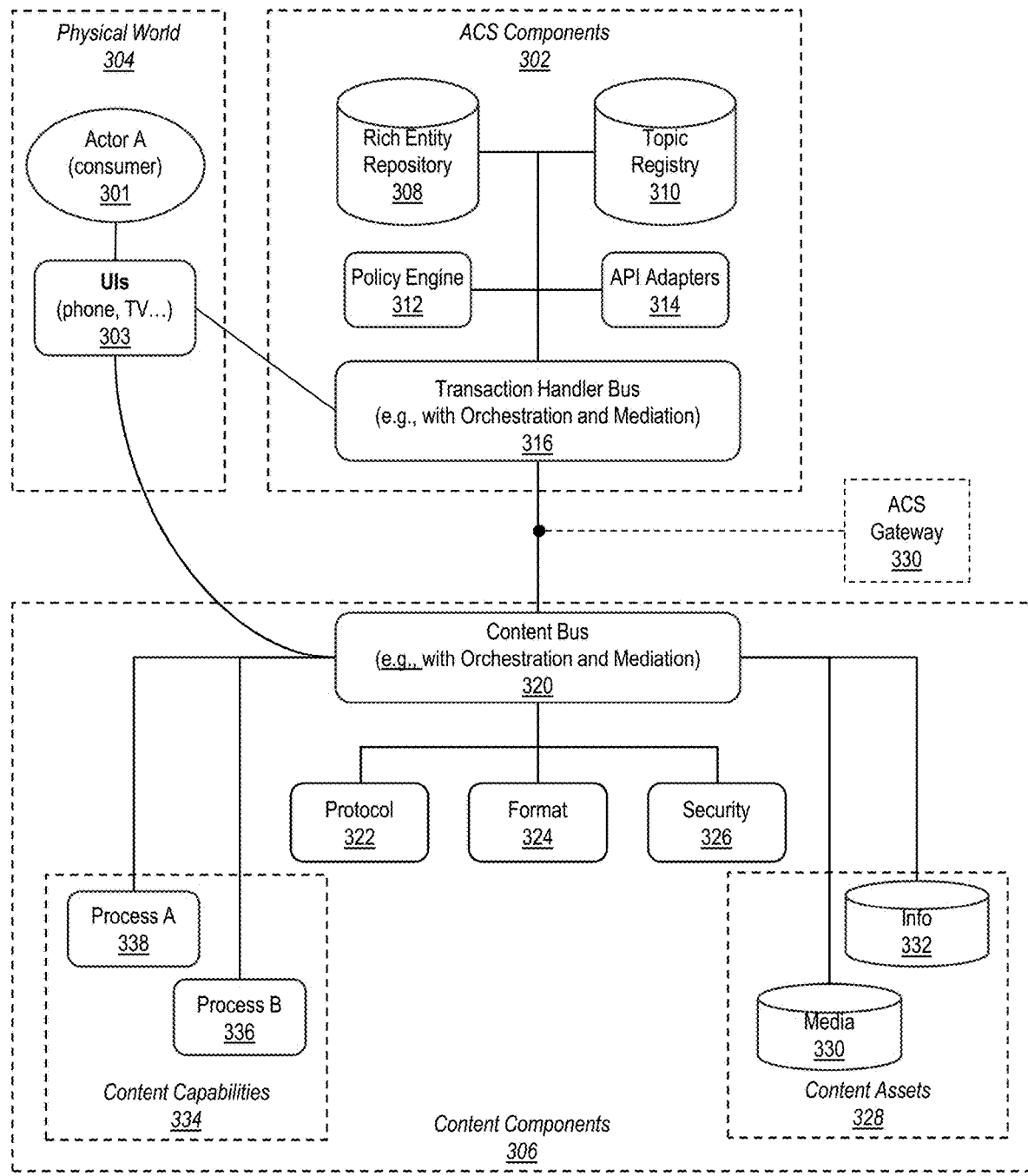
FIG. 3 depicts an illustrative embodiment of an actor centric services architecture of FIG. 1.

FIG. 3 depicts an illustrative embodiment of an example architecture 300 of the system 100 (FIG. 1) according to an ACS paradigm, referred to herein as an ACS architecture 300. The ACS architecture 300 includes ACS components 302 in communication between real-world components 304 and content components 306.

The ACS components 302 of the illustrative example include a rich entity repository 308, a topic registry 310, a policy engine 312, API adapters 314, and a transaction handler bus 316. In some embodiments, a personal agent acts as front-end to services and interacts with a consumer 301. For example, the personal agent can be provided by the ACS components and configured to act as proxy for the consumer 301 for transactions with one or more service platforms. The rich entity repository 308 provides a listing of known participating actors 301 who can use ACS services, along with pertinent information about each actor 301, and/or pointers to the same. The topic registry 310 provides a listing of content in the form of topics publish by the actors 301. The topic registry 310 exposes selected sections of an actor's content and/or resources for consumption by other actors. It is understood that an actor and/or service provider may choose to identify at least some of an actor's resources as private, or otherwise not exposed in the topic registry 310. The policy engine 312 determines a proper logic to apply to fulfill a transactional request and returns service logic to a transaction handler 316 to execute. The API adapters 314 provide routines that can translate requests of all supported kinds into proper API requests as needed. The Transaction Handler Bus, with Orchestrator (THO) and mediation 316 is an engine for ACS transactions, facilitating such transactions, e.g., by pulling together needed info and functions.

In at least some embodiments, the ACS components 302 also include a personal agent that acts as front-end to services, interacting with the requesting entity. The personal agent can act as proxy for a consumer on service platforms.

The physical world components 304 of the illustrative example can include a physical entity or actor 301, such as an individual, and equipment of the individual 303. The Actor 301 can be a consumer, a producer or both of a requested transaction. The equipment 303 can include, without limitation, a computer, a laptop, a game console, a remote control, a smart phone, a smart TV, a tablet computer, a personal digital assistant, vehicle, a kiosk, a vending machine, a robot, an electronic appliance, a medical device, a security system, or other device. The equipment 303 can include a user interface that facilitates transactions and/or access to content requested in association with any transactions.

The content components 306 of the illustrative example can include a Content Bus, with Orchestration (CO) and mediation 320, protocol mediation 322, format mediation 324, and security services 326. The Content Bus, with Orchestration (CO) and mediation 320 provides a hub for access to content functions, with an ability to orchestrate resources to fulfill complex requests.

The protocol mediation 322 converts protocols used by providers and/or consumers to promote interactions therebetween to work properly. The format mediation 324 converts media asset formats from media providers to consumers to make the consumption possible when there are mismatches. The security services 326 provides needed processing and/or assets (e.g., token) to enforce security rules on content of all kinds In some embodiments, the content components 306 further include content assets 328. In the illustrative example, the content components 306 includes one or more of media asset object repositories 330 and media content information repositories 332. The media asset object repositories 330 provide repositories for content assets, such as video, audio, web pages, and the like. Likewise, the media content information repositories 332 provide repositories for content information, such as metadata.

In some embodiments, the content components 306 further include content capabilities 328. The content capabilities 328 can include various content processing functions 336, 338. The content processing functions 336, 338 can include any functions that provide services for any content requirements, such as language, conversion, metadata format translation, indexing, and the like.

In at least some embodiments, the ACS architecture system 300 includes a Natural Language Bus, with Orchestrator (NLO) and mediation. The NLO can serve as a hub for access to natural language functions, an in at least some instances, include features that orchestrate resources to fulfill complex requests. For example, the NLO can include one or more of a conversation engine, a grammar parser, a text-to-speech converter and a speech-to-text converter. The conversion engine is configured to understand or otherwise interpret context in a natural language transactional conversation, e.g., factoring that understanding into construction of grammatically correct and appropriate responses. The grammar parser is configured to disassemble natural language expressions and assign terms to grammar elements so that API requests can be constructed. The text-to-speech converter converts text input to emulated speech audio output. Likewise, the speech-to-text converter converts audio of speech as an input to a text output. A natural Language dictionary provide a resource, e.g., a database, of natural language terms, that in at least some configurations, include information about each term to support assignment of terms for syntactically correct APIs.

By way of illustrative example, an Actor (Paul) requests a Yankee's game via an available client application or "app" user interface 318. Paul takes on a role of a consumer by initiating the request for content of the Yankee's game. The Client app 318 sends a request for content to the THO 316. The THO 316 consults the Policy Engine (PE) 312 for transaction logic. The THO looks in the Topic Registry (TR) 310 for matching topics, i.e., Yankee's game. The Topic Registry 310, in response to the inquiry, returns ESPN (recorded) and YES network (live) to the THO 316. It is understood that one or more of the corresponding topic entries can include indicia of corresponding personas of ESPN and/or YES network that, in turn, can include information and/or pointers to information, such as available resources, that facilitate satisfaction of the request.

The THO 316 examines a Rich Entity Repository (RER) 308 for a persona of a rich entity associated with Paul. The persona, e.g., identifies Paul's subscriptions and default device type as resources. In the illustrative example, the rich entity identifies that Paul has subscription to both YES network and ESPN. The THO 316 informs the client app on Paul's device 318 of the two available choices. Paul enters a selection at his device 318 through the user interface of the client app, selecting the live game on YES on the user interface.

It is understood that in some embodiments, the rich entity can include one or more policies or rules that can be applied. For example, a rule can be applied to situations in which multiple sources of requested content are identified. For example, the rule can identify a hierarchy of specific sources and/or source types of categories. The rule can further include a preference and/or logic to make a selection from among the multiple sources. For example, live media can be chosen over recorded media, or vice versa, when both options are available. Other logic can evaluate one or more of cost implications, quality, reliability, formats (e.g., small screen versus high definition, or 4K) network type, path, location, status, discounts, loyalty programs, recommendations and/or comments related to the sources, and so on.

The THO 316 sends a request from the client app to API Adapters (AA) 314 to translate the text elements into a suitable API format for accessing the selected content. Suitable API format can be determined via the rich entity of the chosen source, i.e., the producer. Alternatively or in addition, the suitable API can be determined via a rich entity of the content itself. Generally speaking, each of the consumer, Paul, or more appropriately, Paul's digital persona, the source or producer, YES network, and the requested content, Yankee's game, can be considered topics, each having a corresponding rich entity.

The THO 316 uses the API to request content from the Content Orchestrator (CO) 124 (FIG. 1), which is configured to pull together the requested content channel. The CO 124 uses information in the API call to determine one or more of security, formats and protocols needed for accessing the requested content and for providing the content in a manner conducive to consumption or use by the requesting client device(s).

The CO 124 facilitates content access for the requested channel as proxy for Paul, and returns the result to the THO 316. The THO 316 notifies a default client device 318 of a connection address for the requested content. The client app 318 informs default UI device (e.g., Paul's TV) of content address, and the TV tunes to the connection address to obtain the requested content for presentation to the consumer, Paul. The CO 124 manages the content, as needed, as Paul interacts with a rich media user experience, e.g., including webpages, streaming videos, data feeds, chat, etc., which are part of the example channel.

In some embodiments, the ACS architecture 300 includes an ACS gateway 330. The ACS gateway 330, when provided, facilitates transactions between ACS-compliant and non-ACS compliant entities.

Figure 4:
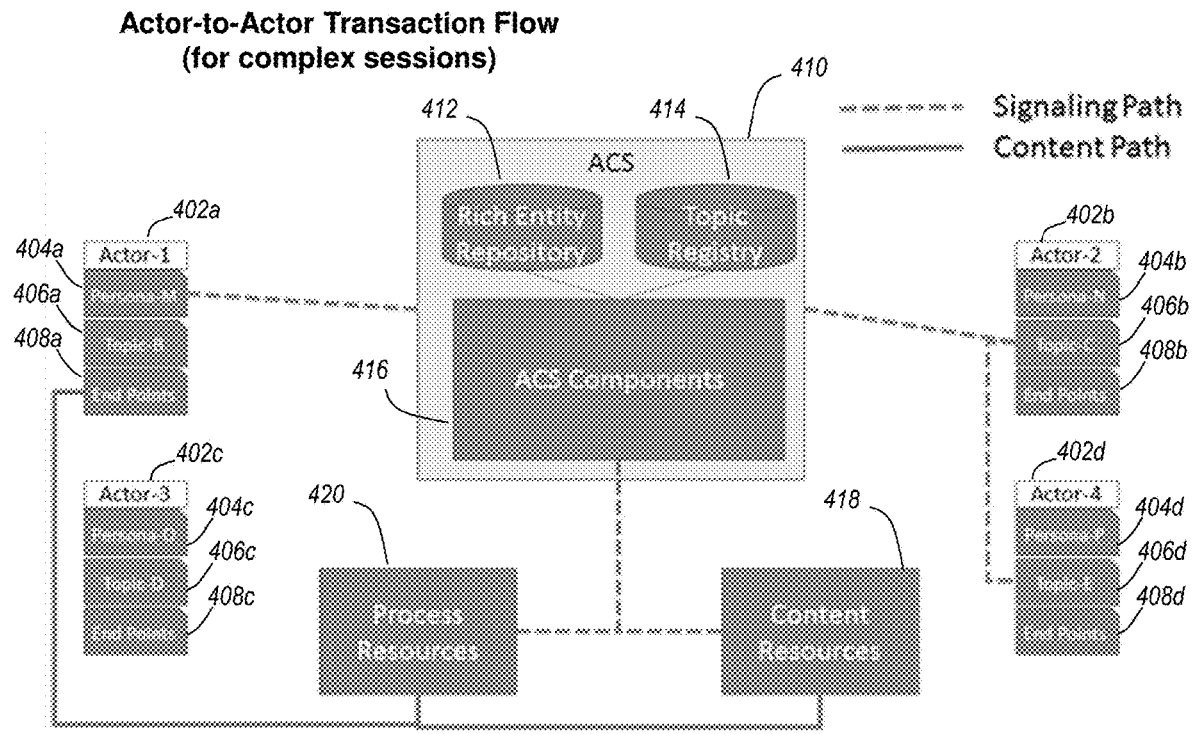
FIG. 4 depicts an illustrative embodiment of an actor-to-actor flow.

FIG. 4 depicts an illustrative embodiment of a digital transaction system 400 engaged in an actor-to-actor transaction according to an ACS paradigm. Namely, a first actor, Actor-1, requests an item, Topic-C, from a second actor, Actor-2. Topic-C, however, includes a nested topic, i.e., Topic-E. In order to fulfill the initial request, the nested Topic E, is obtained by way of another request involving another actor, Actor-4.

A first actor entity 402a, is represented by a corresponding persona, i.e., Persona-M 404a, having an associated topic, i.e., Topic-B 406a, and with one or more associated end points 408a. A second actor entity 402b, is represented by a corresponding persona, i.e., Persona-N 404b, having an associated topic, i.e., Topic-C 406b, and with one or more associated end points 408b. A third actor entity 402c, is represented by a corresponding persona, i.e., Persona-O 404c, having an associated topic, i.e., Topic-D 406c, and with one or more associated end points 408c. Likewise, a fourth actor entity 402d, is represented by a corresponding persona, i.e., Persona-P 404d, having an associated topic, i.e., Topic-E 406d, and with one or more associated end points 408d.

The digital transaction system 400 includes an ACS system 410. The ACS system 410, in turn, includes a rich entity repository 412 a topic registry 414 and one or more other ACS components 416. The other ACS components 416 can include, without limitation, a transaction handler 112, a channel orchestrator 124 (FIG. 1), a policy engine 312, API adapters 314 (FIG. 3), and the like.

The actor entities 402a, 402b, 402c, 402d, generally 402, can be represented by personas 105 (FIG. 1), e.g., stored in rich entity capsules within the rich entity repository 412. The example actor capsules 402 include provisions for persona data 404, topics 406 and endpoints 408. The topics 406a, 406b, 406c, 406d, generally 406, can be represented by topic entity capsules 104 (FIG. 1), e.g., also stored in the rich entity repository 412. According to the techniques disclosed herein, at least some of the topic entities 406 can be published or otherwise exposed for discovery by listings within the topic registry 414. The topic registry can include indicators, such as labels, that identify one or more of the topics 406. Namely, if a user chooses to publish a topic, a label or similar entry can be provided in the topic registry. It is understood that one or more topics can include indicia, e.g., pointers to a corresponding persona that can be referenced in relation to transactions involving the particular topic. It is conceivable that topic labels can be removed from the registry, e.g., by a decommissioning process. At least some aspects of the entities 402, such as the personas 404, can be used for one or more of authentication, authorization and accounting.

The digital transaction system 400 also includes one or more content resources 418 and one or more process resources 420. The content resources 418 can include, without limitation, repositories of stored digital content, such as media content, e.g., still images, audio, video, data files, e.g., documents, books, catalogs, e.g., electronic programming guides and/or product catalogs, software programs, apps, and the like. The content resources can include one or more of content provided by a service provider, content provided by service subscribers, e.g., peer content, content provided by third parties, such as content producers, content brokers, and the like. In at least some embodiments, one or more of the actors 402 and/or the content resources 481 can include machines, e.g., according to Internet of Things scenarios. Thus, an individual, such as Actor-1 402a, a subscriber, may engage in a transaction with another real entity, such as Actor-2 402b, a service provider, to access content from a machine, e.g., Actor-4 402d, a sensor from a home monitoring/security system.

A signaling path is illustrated by dashed lines. The signaling path includes an initial request for Topic C, from Actor-1 402a to Actor-2 402b and a supplemental request for Topic E, from Actor-2 402b to Actor-4 402d. The ACS components 461, such as a transaction handler communicate with one or more process resources 420 and/or content resources 418 over a signaling path. The process resources 420 and/or content resources 418, in response to signaling from the ACS components 416, respond to the initial request of Actor-1 402a, by providing the requested item(s). A content path is portrayed as a solid line extending between the process resources 420 and/or the content resources 418 and Actor-1 402a. The request is fulfilled by processes and/or content delivered or otherwise provided over the content path.

The transaction handler accepts and interprets requests received via API(s) of the actor entity 402. The transaction handler accepts validated requests from Actor-1 402a to use a specific persona, namely Persona-M. The transaction handler is configured to establish the persona, to make calls to processes, e.g., those processes that are part of the persona's capabilities, and to carry out actions that facilitate enacting or otherwise servicing requests from the Actor-1 or as proxy for the individual. In more detail, the transaction handler orchestrates fulfillment of the request, applying appropriate security measures (e.g., receives the request to access Topic-C 406b, validates the request, accesses a manifest file for topic 406b, access information, such as, protocols, formats, permissions, and ultimately fetches facilitates delivery of the requested content. It should be understood that although Topic-C 406b is associated with Actor-2 402b, the topic itself can be represented by a topic entity 104 (FIG. 1) within the rich entity repository 414.

In at least some embodiments, each of the actor entities 402 includes one or more endpoints 408a, 408b, 408c, 408d, generally 408. An endpoint can include an address of a device, e.g., a media processor or mobile device. Alternatively or in addition, endpoints can include one or more of applications, network sockets, storage locations, and the like. In some embodiments, the actor's entity capsule 402 includes multiple endpoints 408. One or more particular endpoints of a group of endpoints can be determined according to the request. For example, the request can be initiated by an application that has a predetermined associated endpoint 408. Alternatively or in addition, an endpoint can be explicitly identified in a transaction request, or determined according to a user preference.

Figure 5:
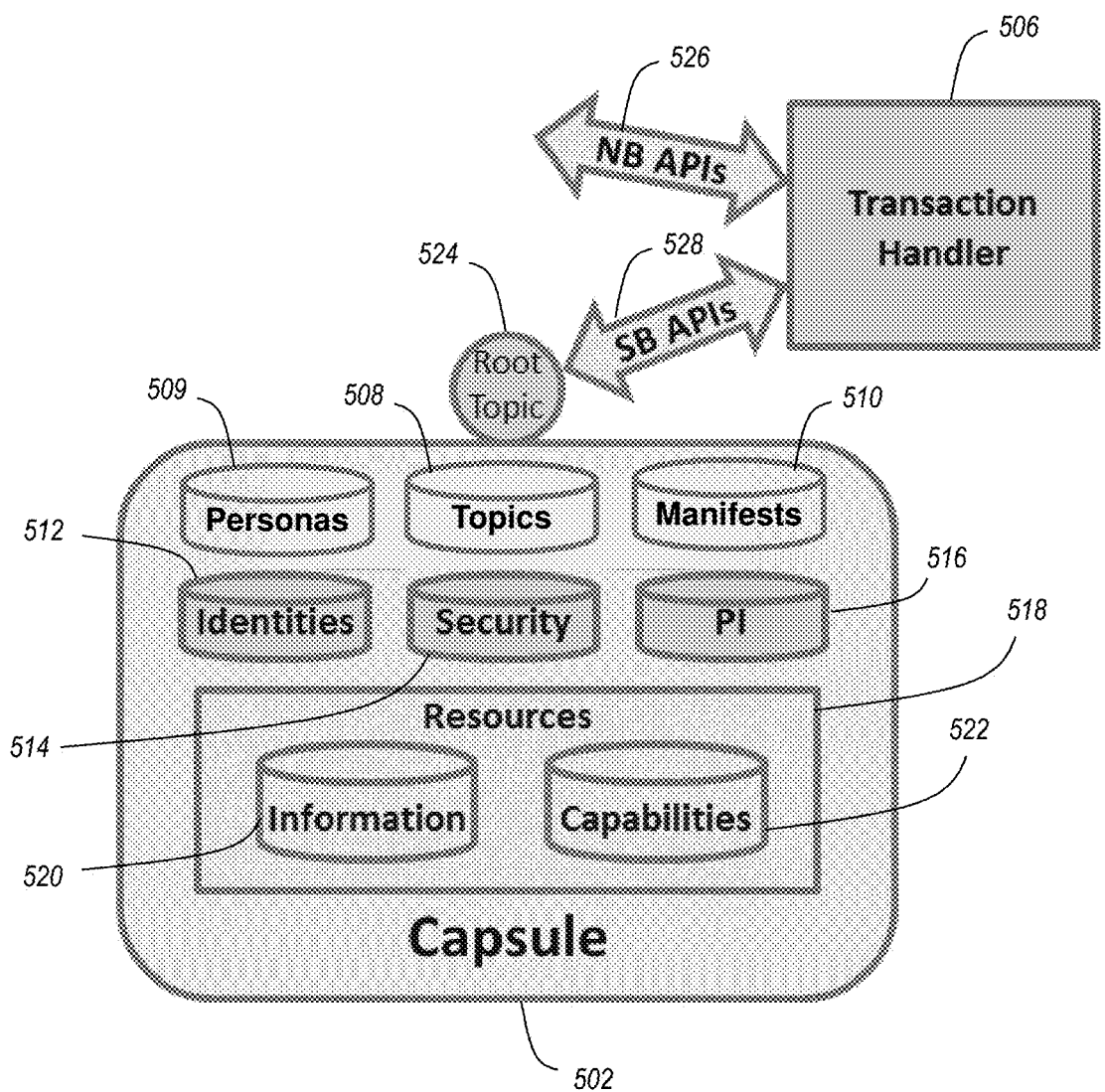
FIG. 5 depicts an illustrative embodiment of functional portions of an entity of the systems of FIG. 1 and according to the architecture of FIG. 3.

FIG. 5 depicts an illustrative embodiment of functional portions of an entity 500 of the systems of FIG. 1 and according to the ACS architecture of FIG. 3. The entity 500 includes a rich entity capsule 502 as a an object or data structure suitable for holding or otherwise organizing one or more information items related to the entity 500. The data structure can be considered as a logical container or capsule. For example, the rich entity capsule 502 can include a standard taxonomic structure for containing all information related to the entity 500, based on a digital object as a template. The information can include, without limitation, metadata, data, pointers to and/or any other suitable reference to data available elsewhere, and any combinations thereof. The taxonomic structure provides a place for all information that is specifically germane to the entity 500. In at least some embodiments, empty parts of such a taxonomic structure can be truncated and/or left empty. A combination of the standard taxonomic structure and entity specific information comprise the entity's "capsule" 502.

It is understood that one or more features of a rich entity capsule can be predetermined according to a standards body, such as an ACS service provider, and/or an independent organization for use by different ACS service providers. Such standard taxonomic structures of rich entity capsules can provide features, such as semantic alignment, to promote or otherwise facilitate implementation of ACS architectures that prevent segmentation of data along application and/or service boundaries.

In the illustrative embodiment, prominent components of the rich entity capsule 502 include: a root topic 504; topics 508; manifests or manifest files 510; identities 512; security 514; private information 516; and a resource catalog 518 that includes information 520 and capabilities 522.

Each entity 500 includes a unique identifier, referred to as a "topic label" or "root topic" 524, which is both a label for the entity and an address by which the entity's capsule 502 can be accessed. An example of such a topic label 524 could be a uniform resource name (URN). In at least some instances, the topic label is referred to as a root topic 524.

The capsule 502 can include other topics and topic labels 508 that represent groups of information within the capsule 502. The highest level of topic is a root topic 524, which points to all the information available within the entity's capsule. The root topic 524 includes the root topic label and an associated manifest file 510, e.g., a master manifest file, which maps out the information contained within the root topic. In some embodiments, a root topic 524 simply includes pointers to published sub-topics and unpublished information, or all known content or any combination of these.

The information in a capsule can be grouped into sub-topics 508, which expose limited and defined parts of the entity. A topic 524 can be published to a topic registry 114, 204, 310 (FIGS. 1-3) to allow other entities to be able to find the topic.

A sub-topic 508 can be discovered by addressing the root topic 524 and filtering, e.g., on public information within the capsule 502. The result can include sub-topic labels for any information that passes the applied filter.

Every entity includes an identity branch 512 of the capsule structure 502 to hold identity information 512 for the entity. Identity information 512 can include any information pertaining to identity issues, such as aliases, personas, reach identifiers, application IDs, rules, roles, profiles, and the like. The information 512 can be in the form of data and/or redirection addresses. Also part of the identities information 512 are rules for any listed identifiers and information about subscribed identity services.

In at least some embodiments, the entity 500 includes a security portion 514 of the capsule structure 502 to hold all security information for the Entity. Security information can include any and all information pertaining to security issues, such as parameters and/or values, formats, permissions, digital rights management, Create, Retrieve or Read, Update and Delete (CRUD) access controls, Authentication, Authorization and Account (AAA) information, parental controls, rules, and the like. The security information 514 can be in the form of data and/or redirection addresses. Alternatively or in addition, at least a part of the security information 514 include rules for any listed security methods and information about subscribed security services.

Information in the capsule that is not part of the capsule resources is information about the entity itself, referred to generally as private information 516. This includes any and all kinds of entity information, e.g., addresses, personal information, behavior histories, preferences, insight information, etc.

The resource portion 518 or branch of the capsule structure 502 holds the entity's resource catalog and resource information 520 for the entity 500. Resource information 520 can include any and all information pertaining to available resources, such as histories, subscriptions, owned content, capabilities 522, and the like. The information can be in the form of actual data or redirection to the information, e.g., topic label. In the case of legacy compatibility, this information can take the form of addresses to the legacy resources. In at least some embodiments, information 520 referenced in the resource catalog 518 can be considered public. Such public information, however, can still be subject to entity access and usage rules.

The capsule's information resource section 520 can include internal and external information sources, e.g., organized or otherwise partitioned as respective sub-sections. An external information resource sub-section can include any information not owned by the entity, such as public domain information or information owned by another entity, to which the entity 500 has access and permissions. External information resource sub-section can includes subscriptions to information services.

Likewise, the internal information resource sub-section includes any information owned by the entity and to which the entity has access and permissions. This information can include subscriptions to storage services in which the entity owned information may be stored. All information resources 520, whether internal or external, can include rules for and/or information about the listed information resource.

The capsule's capability resource section 522 of the entity 500 includes internal and/or external processing sources. The external capability resource sub-section includes any processes not owned by the entity, such as public domain processes or processes owned by another entity, to which the entity has access and permissions. This includes subscriptions to processing services and to processing services with which the entity has an active account.

The internal capability resource sub-section includes any processes owned by the entity and to which the entity has access and permissions. This includes processes which the entity owns, whether they are hosted on a hosting service or on a platform owned and run by the entity. Included with the Information Resources, internal and/or external, are rules for and information about the listed capability resource.

An API or set of APIs related to the entity topic are provided to enable the entity to enter into transactions with other entities. These APIs can define the types of interactions supported by the entity. In the illustrative embodiment, the APIs include Northbound APIs (NB APIs) 526 between a transaction handler 506 and external entities and Southbound APIs (SB APIs) 528 between the transaction handler 506 and the root topic 524 of the capsule 502. APIs supported by the capsule 502 can be public or private, and can be available to consumer entities directly or via an exposure layer, as requirements may dictate.

The transaction handler 506 can be identified by a predetermined association with one or more of the root topic 524, and/or one or more sub-topics 508 and one or more personas, referenced in the rich entity's resource catalog 518. The transaction handler 506 section can include namespace addresses as needed to interpret the entity information contained in the capsule 502.

The Transaction Handler 506 accepts and/or interprets requests received via the API(s) 526, 528 of the Entity 500 and facilitate orchestration of their fulfillment. In at least some embodiments, the transaction handler facilitates such fulfillment of requests by applying appropriate security measures. Alternatively or in addition, the transaction handler 506 creates, generates or otherwise originates and/or carries out requests to other entities. In at least some embodiments, the transaction handler 506 accesses any manifest files related to a topic as needed, accesses any persona information (e.g., settings, rules) as needed, and/or acts as a proxy for the entity 500. In its capacity as proxy, the transaction handler 506 includes an ability to negotiate and/or initiate transactions with process and/or information providers that may or may not be listed in the resource 518 section of the capsule 502.

In some embodiments, a nested topic can be associated with the transaction handler 506 of a host topic or with a different transaction handler set by the owner of the nested topic, as rules allow.

Every topic is associated with at least one manifest file 510 in support of all entity APIs. Manifest files 510 identify, expose or otherwise provide maps of information found within the capsule 502. Manifest files 510 can be pre-existing or generated. In at least some embodiments, the manifest files 510 are configured according to a schema. A logical manifest file is provided for every published topic, including the root topic, e.g., as a default. The root topic manifest file includes all information in the capsule.

In at least some embodiments, the manifest file 510 announces populated branches of a rich entity capsule 502, e.g., as topics and/or personas, as pertains to each API request 526, 528. Accordingly, the manifest file 510 announces one or more of the identity(s), security requirements, content within a given topic of the entity and the capabilities of that topic available for a given request, as the capabilities may differ based on other factors, such as the request.

In at least some embodiments, the manifest file 510 defines a content channel, i.e., "channel," which is associated with a topic label, i.e., topic, for the transaction initiated by a request via the API(s).

An entity's capsule 502 can include nested entities. By way of example, a simple case of nesting is that of an entity referenced within another entity's resource catalog. Nested entities can take the forms of the topic, persona or both topic and persona.

Figure 6:
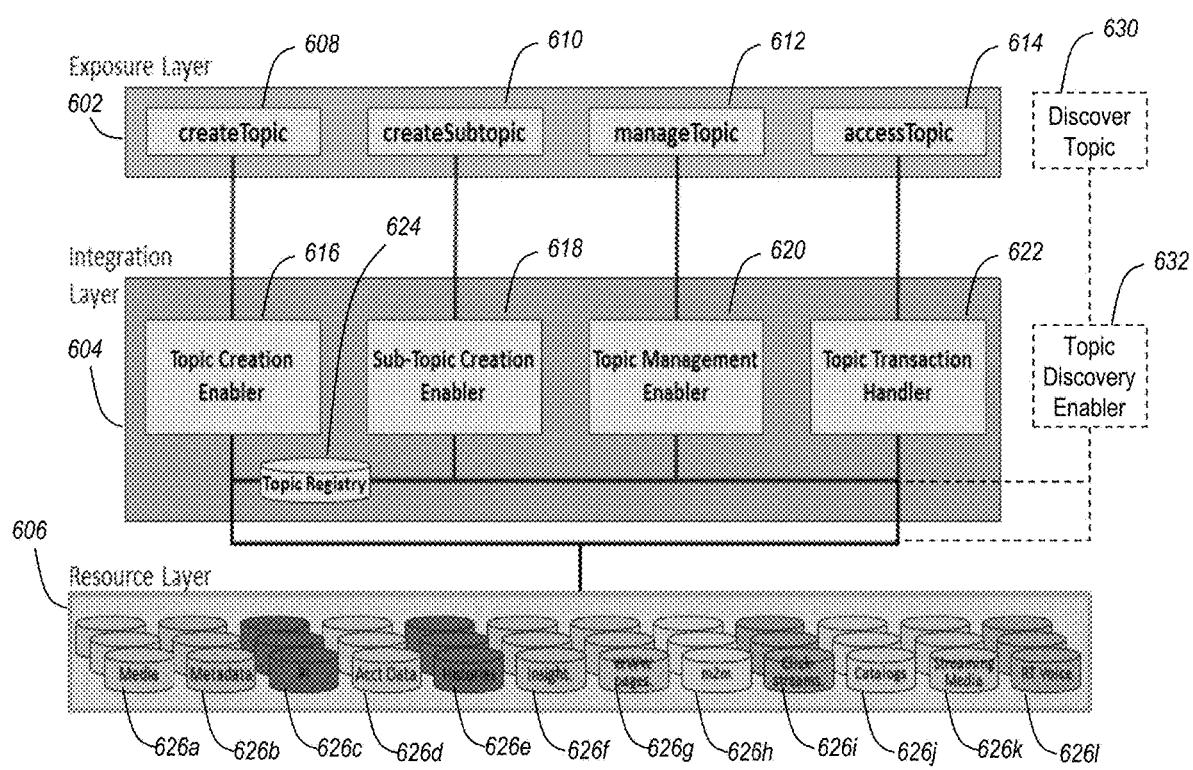
FIG. 6 depicts an illustrative embodiment of a topic services portion of the systems of FIG. 1 and according to the architecture of FIG. 3.

FIG. 6 depicts an illustrative embodiment of topic services 600 of the systems of FIG. 1 and according to the architecture of FIG. 3. A topic provides a vehicle that allows an entity's information to be exposed. It is understood that various types of services can be deployed in support of topics, including, without limitation, one or more of the example services disclosed hereinbelow.

The example topic services 600 includes an exposure layer 602, an integration layer 604 and a resource layer 606. The exposure layer 602, includes one or more of a create topic API 608, a create subtopic API 610, a manage topic API 612 and an access topic API 614. In at least some embodiments, the exposure layer 602 is implemented by one or more of an API gateway server and a router. The integration layer 604, includes one or more of a create topic enabler 616, a create subtopic enabler 618, a manage topic enabler 620 and an access topic enabler 622. In at least some embodiments, the integration layer 604 can be implemented in middleware. The example integration layer 604 includes a topic registry 624.

The create topic API 608 is in communication with the topic creation enabler 616, which is in further communication with the resource layer 606. Likewise, the create subtopic API 610 is in communication with the sub-topic creation enabler 618, the manage topic API 612 is in communication with the topic management enabler 620, and the access topic API 610 is in communication with the topic transaction enabler 618. Each of the sub-topic creation enabler 618, the topic management enabler 620 and the topic transaction handler 622 is in further communication with the resource layer 606. In the illustrative embodiment, each of the topic creation enabler 616, the sub-topic creation enabler 618, the topic management enabler 620 and the topic transaction handler 622 is in further communication with the topic registry 624.

The resource layer 606 includes, in turn, one or more of media resources 626a, metadata resources 626b, private information resources 626c, account data resources 626d, history resources 626e, insight resources 626f, web page resources 626g, machine-to-machine resources 626h, click streams resources 626i, catalog resources 626j, streaming media resources 626k, real-time voice 626l.

The create topic API 608 and the topic creation enabler 616 allow an actor entity to create a topic and an associated topic manifest. The topic manifest can be in the form of a data item, such as a file, that lists characteristics of and/or items related to the topic. The manifest file can include items, such as topic assess information, e.g., protocol, format, permissions. Topic creation capabilities can include, without limitation, one or more of selecting known data sources, adding new data sources, establishing a topic label and setting topic characteristics and/or permissions.

The create subtopic API 610 and the sub-topic creation enabler 618 allow an actor entity to separate a topic into smaller sub-topics. Sub-topic creation capabilities include, without limitation, one or more of selecting and editing elements and sections within an existing parent topic manifest file, establishing a new label for the new topic and setting sub-topic characteristics and permissions.

The manage topic API 620 and the topic management enabler 620 allow an actor entity to manage an existing topic. Capabilities include, without limitation, one or more of deleting existing resources, adding new resources, relabeling the topic, cloning, deleting, nesting or pruning the topic or sub-topic and changing topic characteristics and permissions by editing the associated manifest file.

The access topic API 614 allows an actor entity to access an existing topic. Capabilities include, without limitation, one or more of selecting a known topic, passing access information (e.g., UID, APPID, consent token) selecting an output format and use of other topic parameters.

The topic transaction handler 622 is associated with each topic. The topic transaction handler 622 accepts requests to the topic, knows how to fetch information and/or make calls to processes that are parts of the topic, and in at least some embodiments, carries out all actions required in order to fulfill those requests According to an "inbound" process, the topic transaction handler 622 accepts validated access topic requests, accesses the topic manifest file for topic access information (e.g., protocol, format, permissions) and fetches and returns the requested content.

According to an "outbound" process, the topic transaction handler 622 discovers topic labels using the topic registry 624, interprets the topic manifest file, formats and places a request via the access topic API 614, and collects the resulting content.

Figure 7:
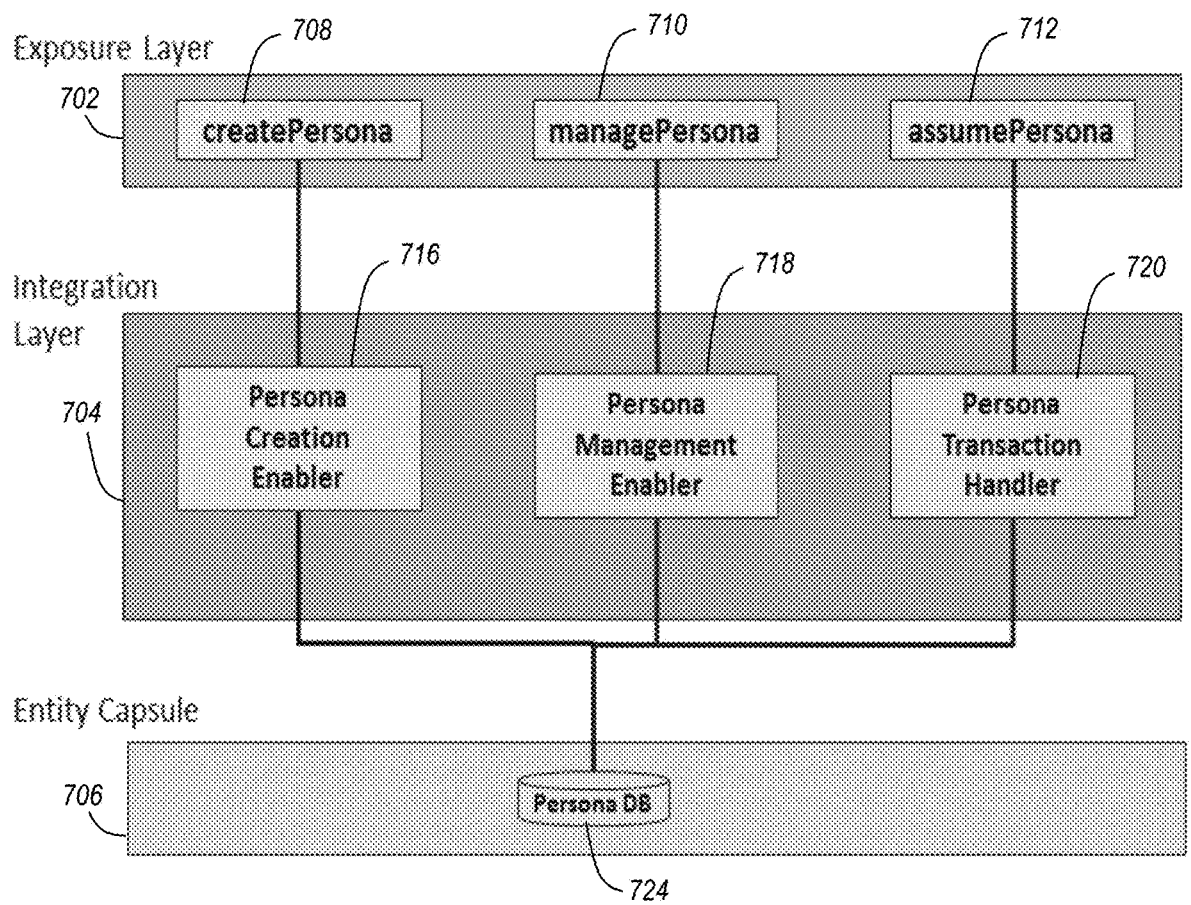
FIG. 7 depicts an illustrative embodiment of a persona services portion of the systems of FIG. 1 and according to the architecture of FIG. 3.

FIG. 7 depicts an illustrative embodiment of persona services 700 of the systems of FIG. 1 and according to the architecture of FIG. 3. A persona is a vehicle by which an owner entity and/or actor's capabilities can be enacted. It is understood that various types of services can be deployed in support of personas, including, without limitation, one or more of the example services disclosed hereinbelow.

The example persona services 700 includes an exposure layer 702, an integration layer 704 and a rich entity capsule 706. The exposure layer 702, includes one or more of a create persona API 708, a manage persona API 710, and an assume persona API 712. In at least some embodiments, the exposure layer 702 is implemented by one or more of an API gateway server and a router. The integration layer 704, includes one or more of a persona creation enabler 716, a persona management enabler 718, and an associated persona transaction handler 720.

The create persona API 708 is in communication with the persona creation enabler 716, which is in further communication with the rich entity capsule 706. Likewise, the manage persona API 710 is in communication with the persona management enabler 718, and the assume persona API 710 is in communication with the persona transaction handler 720. Each of the persona creation enabler 716, the persona management enabler 718 and the persona transaction handler 720 is in further communication with the rich entity capsule 706. In the illustrative embodiment, the rich entity capsule 706 comprises a persona database 724.

The create persona API 708 and the persona creation enabler 716, allow an actor entity to create a persona, including in at least some embodiments, the creation of one or more of associated rules and information of the persona. Capabilities of one or more of the create persona API 708 and the persona creation enabler 716 can include, without limitation, establishing a persona label and setting persona characteristics and rules.

The manage persona API 710 and the persona management enabler 718 allow an actor entity to manage an existing persona. Capabilities of one or more of the manage persona API 710 and the persona management enabler 718 include, without limitation, adding, deleting and editing existing rules and characteristics, relabeling the persona, and cloning the persona to create a new persona and persona label.

The assume persona API 712 allows an actor entity to assume an existing persona when entering and/or while engaged in a transaction. Capabilities of the assume persona API 712 include, without limitation, selecting a known persona, passing access information, e.g., UID, APPID, and/or consent token, and use of other persona parameters.

A personal transaction handler, such as the example persona transaction handler 720 is associated with each persona. This can be the same persona transaction handler 720 for multiple personas engaging in a transaction, or multiple persona transaction handler 720 for the multiple personas engaging in a transaction. The persona transaction handler 720 accepts validated requests from the Actor to use a specific persona. The persona transaction handler 720 is configured to establish the persona, to make calls to processes that are parts of the persona's capabilities, and/or to carry out all actions required in order to enact requests from the actor or as proxy for the Actor.

In addition to the above listed services, functionality may be included in the actor centric services architecture 300 to provide one or more capabilities for transactions in a general senses. For example, referring again to FIG. 6, the architecture optionally includes a discover topic API 630 and a topic discovery enabler 632 (shown in phantom). The discover topic API 630 and topic discover enabler 632 can be employed by a requesting entity engaged in a transaction to identify a topic of the transaction, e.g., using keywords and/or options supported by the enabler 632. In at least some embodiments, the topic discovery enabler 632 makes it optional for an entity to determine the particular topic label to request. By way of non-limiting example, options can include filtering of topics by provider or keywords such as "free," provider name, media type, label includes <string>, wildcards, etc.

In at least some embodiments, the topic registry 624 provides a repository of published topic labels. The registry 624 can be implemented with real-time response capability, e.g., allowing it to be used by entities to publish, discover and/or decommission topics. To the extent any topics have aliases, the topics registry 624 can include any and/or all published aliases for each topic.

A topic can contain combinations of content in any form. Generally, content includes any information that is exchanged between entities. Content can include, without limitation, digital media files, metadata, messages, text, emails, data in databases or big data repositories, web pages and live streams, e.g., video, audio, machine-to-machine (m2m), clickstreams.

A content channel, i.e., "channel" is the content flow resulting from a fulfilled Topic request transaction. A channel can consist of any content accessible within a Topic, including linear or on-demand, streaming or download, text, documents, data records, interactive media and in fact any content available within the topic. A special case involves the sequencing of content into a temporal user experience, called an event.

Event Services are functions that provide an ability to create, manipulate and publish an event, such as a live event, on a topic channel. Coupled with APIs, event services support automated and/or manual event control from services and actor portals. In general, an event can include a collection of channels, topics and/or personas, governed by common event rules. Events are primarily implemented as a persona entity with an event specific interactivity. In at least some embodiments, events can be time bound and have temporal components, e.g., timed and/or synchronized content, time to live limits, etc. It is envisioned that events can be nested within digital entities, e.g., within other entities, including other events.

Alternatively or in addition, event topics can be combined in series, parallel and/or merged. Any combination of event topics comprises a new topic.

Figure 8:
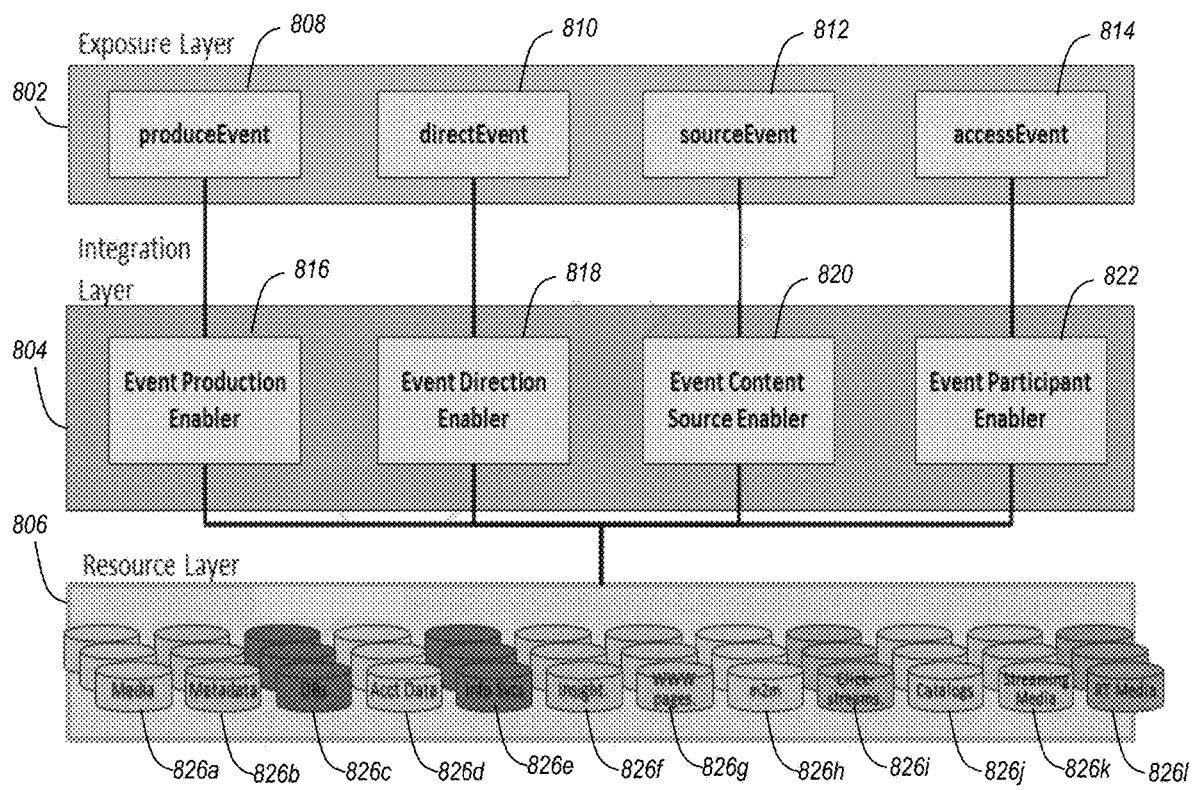
FIG. 8 depicts an illustrative embodiment of an event services portion of the systems of FIG. 1 and according to the architecture of FIG. 3.

FIG. 8 depicts an illustrative embodiment of event services 800 of the systems of FIG. 1 and according to the architecture of FIG. 3. Event services are functions that provide the ability to create, manipulate and publish an event, such as a live event, on a topic channel. When coupled with APIs, event services can support automated and/or manual event control from services and/or actor portals.

In at least some embodiments, event t topics can be combined in series, parallel and/or merged. Generally speaking, any combination of event topics can comprise a new topic.

In an actor representation layer (ARL), "services" are service functions in the form of an entity, and typically are resources to other entities. Instead of users of services, the ARL has inter- and intra-entity transactions, i.e. "transactions." The highest level of activity in the ARL is the transaction. A transaction can occur between two or more entities or within one entity itself Client-server and peer-2-peer legacy services are actually transactional relationships between two entities and their capabilities. In the ARL, entities in a transaction can assume consumer and/or provider roles. Examples of these include a subscriber entity as a consumer and a service function entity as producer or provider. By way of example, an individual, "Joe," an owner of a rich entity, requests a stream of a movie "Raiders of the Lost Ark" from a streaming media service provider, e.g., NETFLIX, also an owner of a corresponding rich entity. In this first example, Joe is a consumer, and NETFLIX is a provider. In another example, NETFLIX requests a list of favorite movies from Joe, to provide some suggestions to Joe's friend, Ann. In this scenario, a subscriber entity, Joe, becomes provider, whereas, a service function entity NETFLIX, becomes a consumer. Incidentally, NETFLIX then becomes the Provider of a recommendation to ANN, who is a Consumer in that Transaction.

In the foregoing examples, a topic of "NETFLIX Recommendations" is a discrete entity, as is a Topic of Joe's Favorite Movies. Joe and NETFLIX publish their respective topics, which would actually become sub-Topics from each respective parent entity.

The example topic services 800 includes an exposure layer 802, an integration layer 804 and a resource layer 806. The exposure layer 802, includes one or more of a produce event API 808, a direct event API 810, a source event API 812 and an access event API 814. In at least some embodiments, the exposure layer 802 is implemented by one or more of an API gateway server and a router. The integration layer 804, includes one or more of an event production enabler 616, an event direction enabler 818, an event content source enabler 820 and an event participant enabler 822. In at least some embodiments, the integration layer 804 can be implemented in middleware.

The produce event API 808 is in communication with the event production enabler 816, which is in further communication with the resource layer 806. Likewise, the direct event API 810 is in communication with the event direction enabler 818, the source event API 812 is in communication with the event content source enabler 820, and the access event API 810 is in communication with the event participant enabler 818. Each of the event production enabler 816, the event direction enabler 818, the event content source enabler 820 and the event participant enabler 822 is in further communication with the resource layer 606.

The resource layer 606 includes, in turn, one or more of media resources 826*a*, metadata resources 826*b*, database resources 826*c*, account data resources 826*d*, history resources 826*e*, insight resources 826*f*, web page resources 826*g*, machine-to-machine resources 826*h*, click streams resources 826*i*, catalog resources 826*j*, streaming media resources 826*k*, real-time voice 826*l*.

The event production enabler 816 allows actors to schedule, produce and/or publish a live event as a live Channel for public and/or private consumption.

The event direction enabler 818 allows actors to manipulate some or all content source materials, e.g., streaming or file-based audio and/or video, images, text, information, so as to conduct a manipulated, edited or otherwise polished user experience driven by the resulting media flow in the defined Channel.

The event content enabler 820 allows Actors to provide or otherwise feed media and/or other forms of content into a live event as part of a live Channel. The resulting feeds can be made available to the event director enabler 818 so that the actor directing the live event can manipulate them into the live user experience.

The event participant enabler 822 allows actors to attend or otherwise access or experience a live event on a topic channel in various modes, e.g., read-only, interactive. The event participant enabler 822 can be accessed by a topic transaction handler associated with the event topic.

Figure 9:
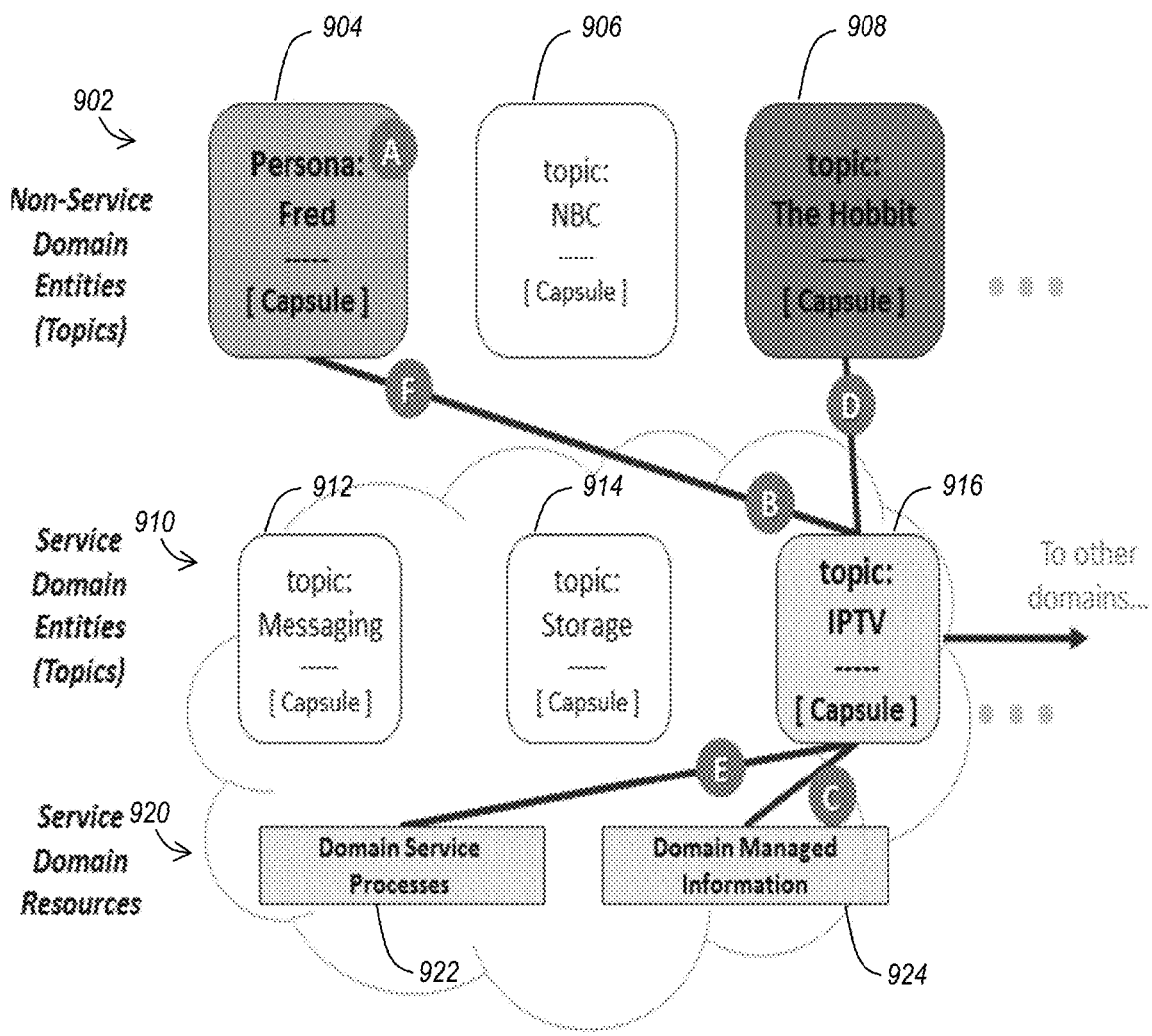
FIG. 9 depicts an illustrative embodiment of an example transaction flow of the systems of FIG. 1 and according to the architecture of FIG. 3.

FIG. 9 depicts an illustrative embodiment of a high-level view of the AOA in reference to an example transaction flow 900 of the systems of FIGS. 1, 2 and 4-8, and according to the architecture of FIG. 3. In the following high-level example, persona and topic handler steps are omitted to make the transaction flow simpler and clearer. The example transaction flow is implemented in a system that includes non-service domain entities 902, or topics that include a persona, Fred 904, NBC 906, and "The Hobbit" 908. The example transaction flow 900 also includes service domain entities 910, or topics that include messaging 912, storage 914, and IPTV 916. The example transaction flow 900 also includes service domain resources 920 that include domain service processes 922 and domain managed information 924.

In a real-world action, a person, Fred, an owner of a rich entity including Fred's persona, requests a movie "The Hobbit" from his tablet device at step "A." Fred's request is implemented via a digital entity representing Fred, e.g., in the cloud. Fred's default persona 904 of his rich entity looks up available sources, e.g., IPTV subscriptions.

Fred's persona requests the movie from his IPTV provider, also an owner of a rich entity, at step "B," passing any information that may be necessary or otherwise required. The request is placed by Fred's default persona 904 via the IPTV provider topic 916. It is understood that in at least some embodiments, the provider topic 916 includes a reference to a persona of the IPTV service provider that can be used and/or otherwise accessed in relation to the transaction.

In response to the request, the IPTV provider's digital entity checks Fred's account by way of the IPTV topic 916 accessing domain managed information 924 at Step "C." To the extent Fred's account does not include any information that would otherwise prevent fulfillment of such a request, the IPTV provider's digital entity, by way of the IPTV topic 916, requests "The Hobbit" for Fred at step "D," passing any required information that might otherwise be necessary to facilitate fulfillment of Fred's request.

The IPTV provider's digital entity, by way of the IPTV topic 916, uses the domain service processes 922 to generate or otherwise obtain a license key, or similar digital rights management, for Fred at step E," and to locate a source of the version of the movie requested by Fred. In at least some embodiments, the domain service processes 922 facilitate location of a particular source, when more than one source are available. Location of the particular source can be based on one or more of source proximity, source quality, cost, delay, user preference, and the like.

The IPTV Provider's digital entity, by way of the IPTV topic 916, returns the license key at step "F" and any other access information that might otherwise be required by Fred's entity 904 to access the movie on Fred's tablet device.

Although the legacy IPTV user experience can be replicated in a user interface of a client application running on a device, e.g., Fred's tablet, the ACS allows for users and applications to access functionality from an IPTV provider directly. For example, a user could request The Hobbit movie from any device and have it sent to any display, without using any service specific IPTV client application. The transaction handlers of the entities involved or otherwise engaged in the transaction can determine a subscribed provider capable of fulfilling the request, e.g., the user's IPTV provider, and return an access key and address to the requested content.

While this enables the IPTV provider to transparently provide content to any user experience, it also enables the IPTV provider to employ very flexible and personalized user experiences that can incorporate blended service outputs, e.g., a coherent user experience presenting a movie, a video call, access to home monitor widgets and/or a document for editing, all of which could be rearranged to suit the user's current activities over time across multiple devices. Content in the user experience can be provided from multiple content providers issuing different licenses and applying different permissions.

Similarly, other existing services' user experiences can be replicated or enhanced. While there is no limitation to which existing services might be supported, a sample list includes, without limitation, signage, messaging, telephony, video-conferencing, search, social utilities, personal user agent, etc. Any service which exists today can be implemented as an ACS use cases.

Figure 10:
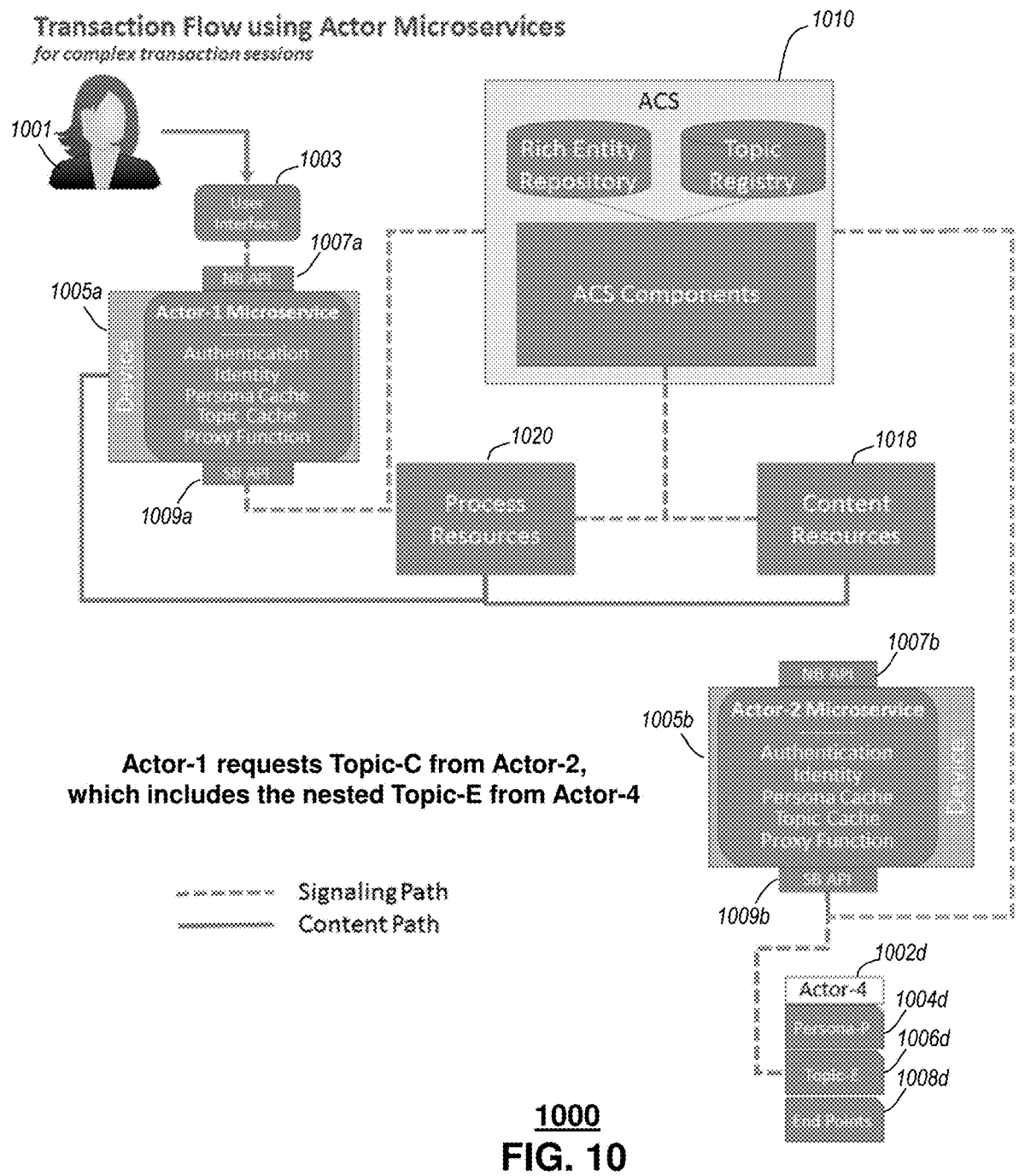
FIG. 10 depicts an illustrative embodiment of a transaction flow using an actor micro-service.

FIG. 10 depicts an illustrative embodiment of a transaction system 1000 including an actor service module, function and/or device that facilitates transactions using an ACS architecture. In at least some embodiments, a real entity, such as an owner or individual 1001, interacts with the ACS architecture by way of a user interface 1003. The user interface 1003 is in communication with a first service module, e.g., an Actor-1, micro-service module 1005*a*. The first micro-service module 1005*a* is in further communication with one or more of an ACS system 1010, one or more content resources 1018 and/or one or more process resources 1020.

The first micro-service module 1005*a* is configured handle one or more functions that facilitate the owner's interaction with the ACS system 1010. For example, the module 1005*a* can facilitate authentication of the actor. Alternatively or in addition, the module 1005*a* can facilitate protection of an identity of an actor. Other functions can include, alone or in combination, protection of cached entity capsule information, cached topic and/or persona manifests, tracking of transaction sessions, e.g., for accounting and/or recovery, and/or support of actor multiplicity via multiple copies and/or proxy functionality.

In the illustrative embodiment, the first micro-service module 1005*a* includes a first API, referred to as a northbound (NB) API 1007*a* and a second API, referred to as a southbound (SB) API 1009*a*. The NB-API 1007*a* connects to equipment of the owner, e.g., the user interface 1003, whereas the SB-API 1009a connects to one or more components of an ACS system 1010. The NB-API 1007a can connect to a driver or proxy functionality for control of topics and/or personas.

In this example, an owner 1001, by way of the first actor, Actor-1, requests an item, Topic-E, from another actor, Actor-2. Topic-C, however, includes a nested topic, i.e., Topic-E. In order to fulfill the request, the nested Topic E, is obtained by way of another actor, Actor-4 1002d. A second micro-service module 1005b includes a NB-API 1007b and a SB-API 1009b. The NB-API 1007b may connect to equipment of a second owner (not shown), whereas the SB-API 1009b connects to one or more components of the ACS system 1010.

A second actor entity includes one or more of a corresponding persona an associated topic, i.e., Topic-C, and perhaps other items, such as authentication, endpoints, and the like. One or more of these entity items can be accessed by way of the micro-service module 1005b of Actor-2. For example, the second micro-service module 1005b can facilitate protection of an identity of Actor-2. Other functions can include, alone or in combination, protection of cached entity capsule information, cached topic and/or persona manifests, tracking of transaction sessions, e.g., for accounting and/or recovery, and/or support of actor multiplicity via multiple copies and/or proxy functionality.

The fourth actor entity 1002d, is represented by a corresponding persona, i.e., Persona-P 1004d, having an associated topic, i.e., Topic-E 1006d, and with one or more associated end points. In this example, requested Topic C includes the nested Topic-E 1006d.

A signaling path is illustrated by dashed lines. The signaling path includes an initial request for Topic C, from the first micro-service module 1005a to the second micro-service module 1005b and a supplemental request from the second micro-service module 1005b to Actor-4 1002d for Topic E. The ACS components 1061, such as a transaction handler communicate with each of the first and second micro-service modules 1005a, 1005b, and with one or more process resources 1020 and/or content resources 1018 over a signaling path. The process resources and/or content resources 1018, in response to signaling from the ACS components 1016, respond to the initial request of Actor-1, through the first micro-service module 1005a, by providing the requested item(s) to equipment of the owner of Actor-1. A content path is portrayed as a solid line extending between the process resources 1020 and/or the content resources 1018 and the equipment of the owner of Actor-1. The request is fulfilled by processes and/or content delivered or otherwise provided over the content path.

Figure 11:
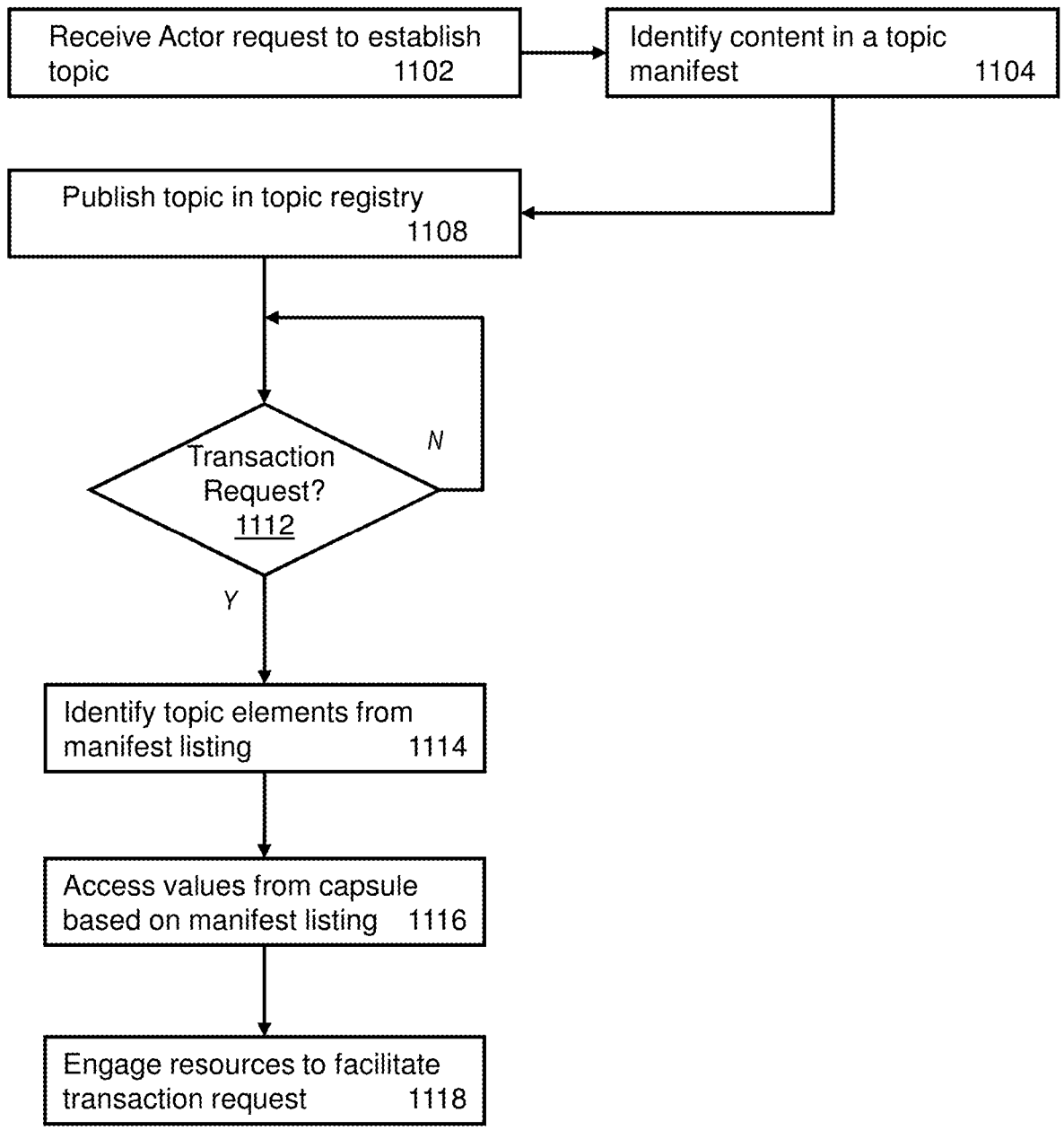
FIG. 11 depicts an illustrative embodiment of a process used in portions of the systems and architecture described in FIGS. 1-10.

FIG. 11 depicts an illustrative embodiment of a process 1100 used in portions of the systems and architecture described in FIGS. 1-10. The process includes receiving a request to establish a topic at 1102. The topic can be identified by a unique identifier, referred to generally as a topic label. The topic label can be a label for the entity and an address by which a rich entity capsule structure can be accessed. By way of example, such label can include a uniform resource name (URN). The rich entity capsule includes a standard taxonomic structure suitable for containing all information related to the entity, e.g., based on a digital object as a template.

Resources associated with the topic are determined at 1104. For example, the resources can be identified in a manifest data item or file of the topic entity. Resources can include, without limitation, histories, subscriptions, owned content, capabilities. The resources can include content and/or services of one or more network service providers, personal content and/or a blend. More generally, the resources can include any information owned by the entity and/or to which the entity has access and permissions.

The topic can be published or otherwise advertised at 1108. For example, a topic label can be included in a topic registry. It is understood that some topics of an entity may not be public, such that they would not be published in the topic registry. Alternatively or in addition, previously published topics can be accessed for modification, and/or decommissioned or otherwise removed from a topic registry. At this stage, one or more established topics have associated with them rich entities that can include, among other features, topic labels, manifest files, content and/or resources.

Monitoring for a transaction request occurs at 1112. To the extent a transaction request is not identified, the monitoring continues. To the extent that a transaction request is identified at 1112, a one or more topic elements related to the transaction are identified from a manifest listing at 1114. The topic elements can include topic labels that point to or otherwise identify an associated topic entity capsule.

One or more values from the topic entity capsule are accessed at 116. The values are accessed by way of a manifest listing of the topic entity capsule.

It is understood in at least some circumstances, more than one topic can be identified in relation to the same requested transaction. In such circumstances, respective manifest files can be evaluated independently. The evaluations can occur simultaneously and/or sequentially. To the extent that more than one of the root topics is available to fulfill the transaction request, a determination is made for a fulfillment strategy.

In some embodiments, the fulfillment strategy includes presenting the more than one topic option to a consumer of the requested transaction, allowing the consumer to choose from among the different options. In some embodiments, the choice is presented to a real-world entity, e.g., as alternative options via a user interface. A choice can be received from the real-world entity via the user interface, and the transaction fulfilled based on the choice.

Unlike existing solutions in which a representation of users and other data are subordinate to needs of a particular service process, the solutions proposed herein subordinate the needs of any particular service provider to the users, e.g., actors. For example, one or more services to which a particular user/actor may subscribe can be identified as resources within the user/actor's associated rich entity capsule. Accordingly, one actor who subscribes to services of one service provider can engage in transactions that involve users and/or content associated with another service provider, without having to pre-coordinate or otherwise obtain access to services of the other service provider. Rather, services of the other service provider can be identified, exposed or otherwise made available on an as-needed basis based on a request for a content and/or service of the other service provider.

Without limitation, the request referred to at 1102 and/or 1112 can be originated from equipment of a network service subscriber, such as a smart TV, a remote control, a smart phone, a residential gateway, a media processor, a general purpose computer, a game console, a proxy and the like. In some request can be generated by an application resident on equipment of a user. For example the application can be related to a subscription service, e.g., provided by a network service provider. Services can include, without limitation, streaming media, real-time voice, live events, file transfer, messaging, social media, and the like.

The topic is identified based on the request at 1112. The topic can be an entity, such as a provider of content and/or services, a source of content and/or services, the content and/or services themselves, peer entities, applications, and the like. For example, the request may include an open-ended request, such as "get the latest episode of 'Game of Thrones'." Here, the topic can be the Game of Thrones and/or a source of related content.

In some embodiments, the topic explicit. For example, "get the latest episode of 'Game of Thrones' from NETFLIX. In this instance, the topic can also be a streaming media service provider, such as NETFLIX.

Alternatively or in addition, in some embodiments, the topic is implicit. For example, an implied topic can inferred from one or more of a content subscription, a media service subscription, a network source, a personal library, a peer-to-peer network, and the like. In the example request for the TV show, the system can infer that a producer or provider or source of a requested content can come from the user's subscriptions, a personal profile, favorites, recent searches and/or prior transactions.

Once the topic has been identified, a topic registry is searched. Topics corresponding to the explicit topics, and/or implicit topics can be searched. The searching can be sequentially, or contemporaneously. For example, a transaction handler extracts terms from a transaction request for use in searching the topic registry. The extracted terms do not have to be topic keywords, but can be terms found in one or more parts of the manifest files. The topics available are not generally known until the transaction handler makes a request to a topic registry using keywords. To the extent that a topic is identified, a manifest file of the identified topic is accessed. For example, a service provider, e.g., Netflix, would have had to publish a topic for its overall movie service, which would include a manifest file listing all available content e.g., movie titles. It is understood that in at least some embodiments, more than one topic will be searched. For such instance, rich-entity data structures for each of the identified topics are accessed.

A topic is basically read-only and passive, whereas, a persona can be read-write and/or interactive. A topic can include one or more personas for interactivity. A persona can include one or more topics to provide content resources. Processing resources are generally accessible to personas and not topics, so if a topic needs processing, a persona can be identified within the topic or otherwise associated with the topic to facilitate that. An example includes a topic that does its own reformatting of content to conform to the requester's device requirements, such as a movie studio owned topic which does not want transcoding or other formatting to be subject to the whim of a third party transcoding/formatting service, which could result in lower quality than desired or other format issues that could be objectionable to the studio.

A manifest file of the rich-entity data structure is searched at 1114 in relation to the request. According to the illustrative example, the search can be accomplished based on keywords including NETFLIX and "Game of Thrones." The topic registry returns topics that match those and possibly other attributes of the request. For example, if the root topic is NETFLIX, a subtopic of the rich-entity data structure might include available series, such as "Game of Thrones." Further subtopics can identify the particular, e.g., "latest" episode.

Figure 12:
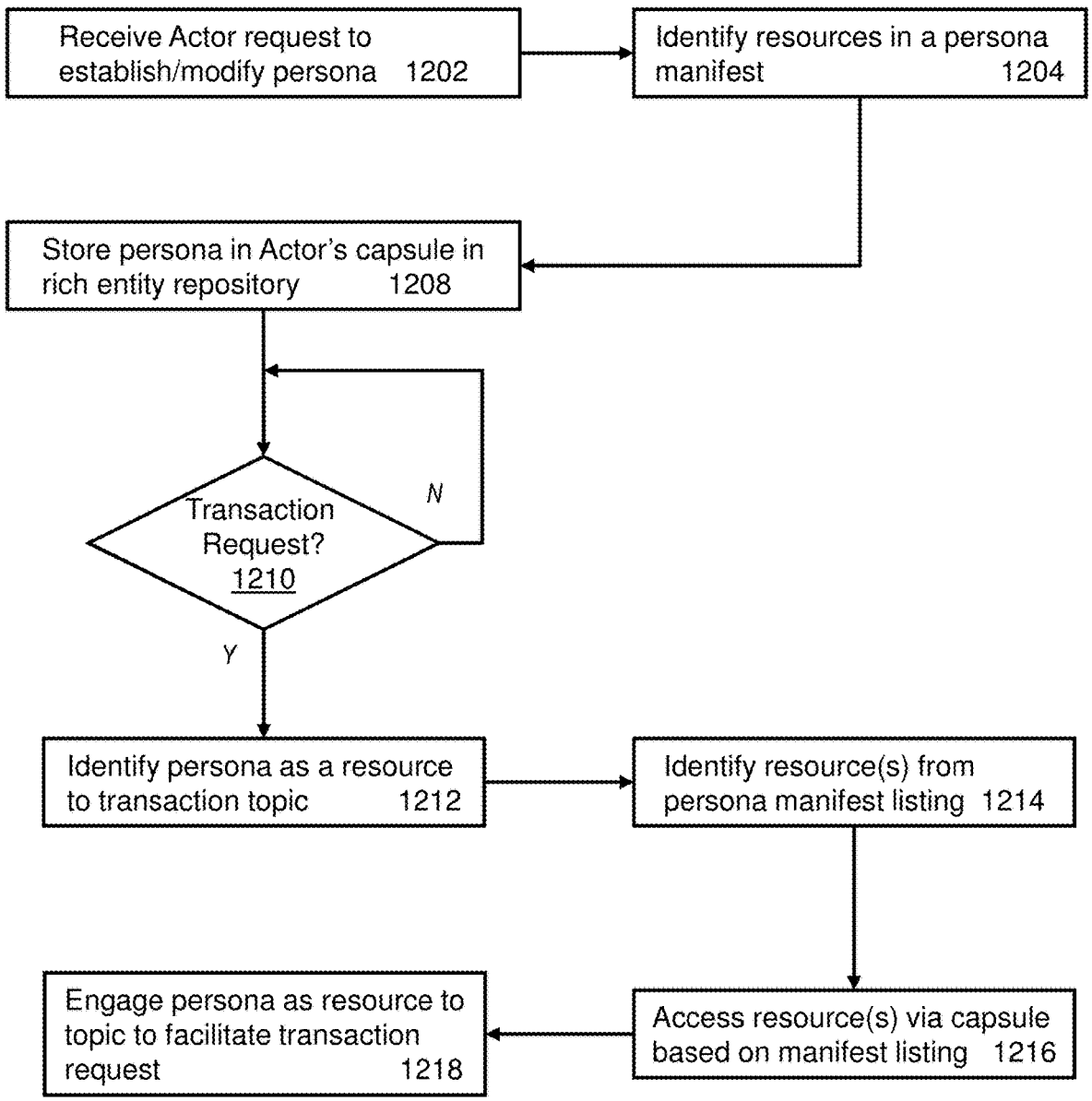
FIG. 12 depicts an illustrative embodiment of another process used in portions of the systems and architecture described in FIGS. 1-10.

FIG. 12 depicts an illustrative embodiment of a process 1200 used in portions of the ACS systems and architecture described in FIGS. 1-10. The process 1200 includes receiving a request to establish and/or modify a persona at 1202. The persona can be identified by a unique identifier, referred to generally as a reference, address and/or label. The label can be a label for the entity and an address by which a persona stored or otherwise referenced within a rich entity capsule structure can be accessed. By way of example, such label can include a uniform resource name (URN). The rich entity capsule includes a standard taxonomic structure suitable for containing all information related to the entity, e.g., based on a digital object as a template.

Resources associated with the persona are determined at 1204. For example, the resources can be identified in a manifest data item or file of the persona. Resources can include, without limitation, histories, subscriptions, owned content, capabilities.

The persona can be stored within the rich entity or stored elsewhere and referenced within the rich entity capsule at 1208. For example, a reference to a persona can be included in a topic stored within a registry. Such referencing of a persona within a topic provides access to persona information, such as resources, authorizations, and the like, that can be used to support a transaction requested by reference to a topic, e.g., without necessarily referencing a persona of a provider of the topic. It is understood that some personas of an entity may not be public, such that they would not be published in the topic registry. Alternatively or in addition, previously established personas can be accessed for modification, and/or decommissioned or otherwise removed from a rich entity capsule. At this stage, one or more established personas have associated with them, manifest files, and/or resources.

Monitoring for a transaction request occurs at 1210. To the extent a transaction request is not identified, the monitoring continues. To the extent that a transaction request is identified at 1210, a one or more personas related to the transaction are identified from a manifest listing at 1212. The persona can be implicit, e.g., determined by an actor associated with the transaction request, and/or otherwise identified within the context of the request. For example, the request can identify topic labels that point to or otherwise identify an associated topic. The topic, in turn, can include a reference to a persona available to support a transaction request to the related topic.

One or more resources identified by way of the persona can be accessed at 1214. The resources can be accessed by way of a manifest listing of the persona portion of an associated entity capsule. The resources can be accessed at 1216, as required in association with the transaction, by way of a manifest listing of the corresponding persona. The persona, e.g., as a resource to a topic of the requested transaction, can be engaged at 1218 to facilitate satisfaction of the transaction request.

The topic is identified based on the request at 1210. The topic can be an entity, such as a provider of content and/or services, a source of content and/or services, the content and/or services themselves, peer entities, applications, and the like. For example, the request may include an open-ended request, such as "get the latest episode of 'Game of Thrones'." Here, the topic can be the Game of Thrones and/or a source of related content.

By way of further example, an owner can create and/or modify a rich entity to include a persona that engages in commercial transactions. The rich entity can include topics, such as information that the owner may wish to expose to authorized commercial entities. For example, an owner may initiate a transaction related to an automobile loan. A lending institution, e.g., a bank may require certain credentials and supporting information to populate a loan application. To the extent that loan requestor has included and authorized access to such credentials, the bank can access the information through the AOA, without necessarily having to contact the owner. It is understood that facilitating access to information for such exchanges can simplify the loan application, saving time and reducing the possibility for data errors and even data compromise.

While for purposes of simplicity of explanation, the respective processes are shown and described as a series of blocks in FIGS. 11-12, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13:
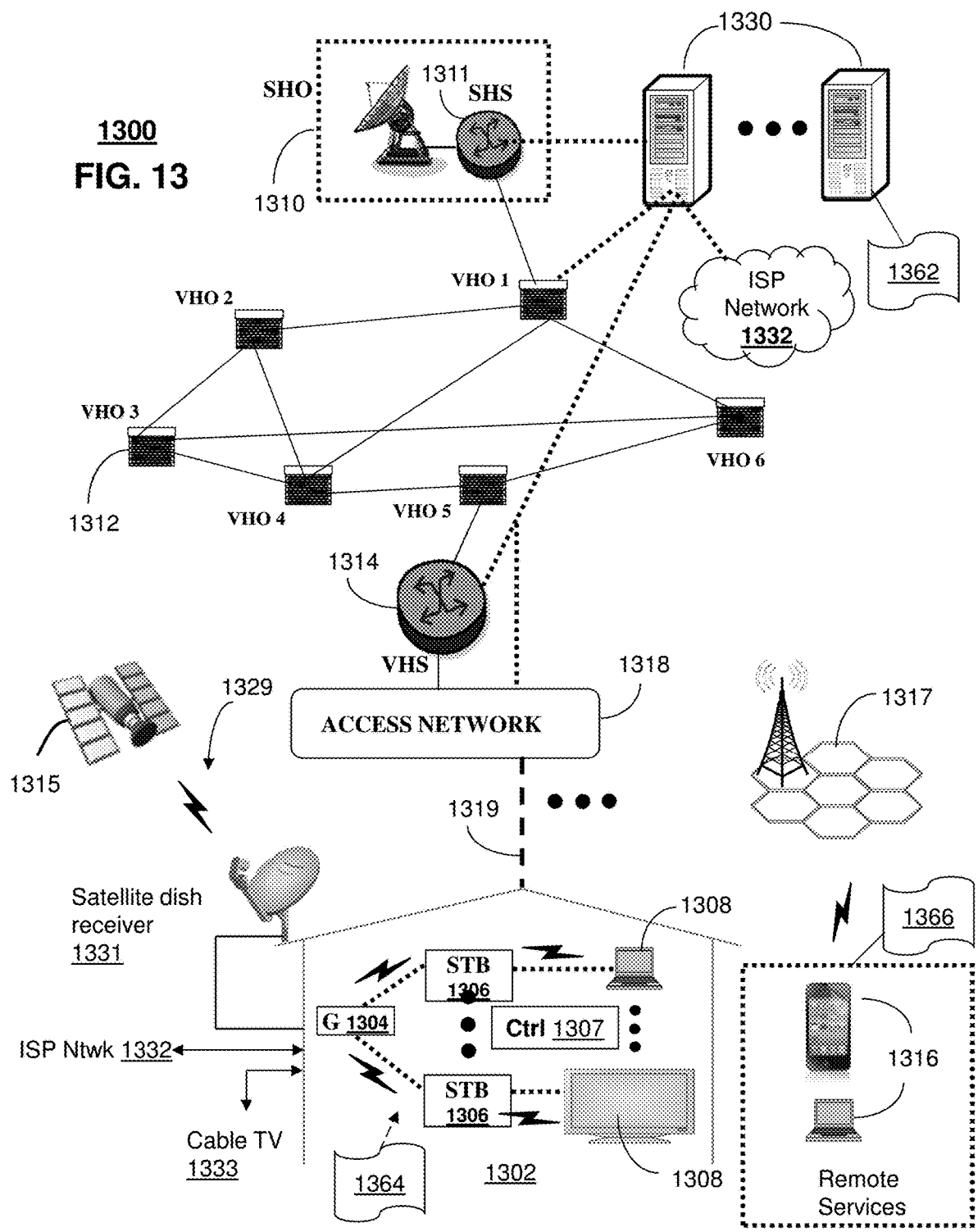
FIG. 13 depicts illustrative embodiments of communication systems that provide media services that are provisioned according to the systems and architecture described in FIGS. 1-8.

FIG. 13 depicts an illustrative embodiment of a first communication system 1300 for delivering media content. The communication system 1300 can represent an Internet Protocol Television (IPTV) media system 1300. The communication system 1300 can be overlaid or operably coupled with the systems 100, 200, 400-800 of FIGS. 1-2 and 4-8 or architecture 300 of FIG. 3, as another representative embodiment of communication system 1300. For instance, one or more devices illustrated in the communication system 1300 of FIG. 13, identifies a topic within a digital service ecosystem comprising a number of differentiated services, associates resources with the topic, and generates a resource catalog that includes pointers to the resources. Alternatively, one or more devices illustrated in the communication system 1300 of FIG. 13, identifies a request for a transaction between a producing actor and a consuming actor within a digital domain. The one or more devices further identify a topic based on the request, identify a matching topic of a topic registry, and access a rich-entity data structure via the topic indicator, wherein the rich-entity data structure includes a resource catalog that is evaluated to identify a resource based on the requested topic.

The IPTV media system 1300 can include a super head-end office (SHO) 1310 with at least one super headend office server (SHS) 1311 which receives media content from satellite and/or terrestrial communication systems. In the present context, media content can represent, for example, audio content, moving image content such as 2D or 3D videos, video games, virtual reality content, still image content, and combinations thereof. The SHS server 1311 can forward packets associated with the media content to one or more video head-end servers (VHS) 1314 via a network of video head-end offices (VHO) 1312 according to a multicast communication protocol.

The VHS 1314 can distribute multimedia broadcast content via an access network 1318 to commercial and/or residential buildings 1302 housing a gateway 1304 (such as a residential or commercial gateway). The access network 1318 can represent a group of digital subscriber line access multiplexers (DSLAMs) located in a central office or a service area interface that provide broadband services over fiber optical links or copper twisted pairs 1319 to buildings 1302. The gateway 1304 can use communication technology to distribute broadcast signals to media processors 1306 such as Set-Top Boxes (STBs) which in turn present broadcast channels to media devices 1308 such as computers or television sets managed in some instances by a media controller 1307 (such as an infrared or RF remote controller).

The gateway 1304, the media processors 1306, and media devices 1308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1306 and subsystems of the IPTV media system for services such as video-on-demand (VoD), browsing an electronic programming guide (EPG), or other infrastructure services.

A satellite broadcast television system 1329 can be used in the media system of FIG. 13. The satellite broadcast television system can be overlaid, operably coupled with, or replace the IPTV system as another representative embodiment of communication system 1300. In this embodiment, signals transmitted by a satellite 1315 that include media content can be received by a satellite dish receiver 1331 coupled to the building 1302. Modulated signals received by the satellite dish receiver 1331 can be transferred to the media processors 1306 for demodulating, decoding, encoding, and/or distributing broadcast channels to the media devices 1308. The media processors 1306 can be equipped with a broadband port to an Internet Service Provider (ISP) network 1332 to enable interactive services such as VoD and EPG as described above.

In yet another embodiment, an analog or digital cable broadcast distribution system such as cable TV system 1333 can be overlaid, operably coupled with, or replace the IPTV system and/or the satellite TV system as another representative embodiment of communication system 1300. In this embodiment, the cable TV system 1333 can also provide Internet, telephony, and interactive media services. System 1300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1330, a portion of which can operate as a web server for providing web portal services over the ISP network 1332 to wireline media devices 1308 or wireless communication devices 1316.

Communication system 1300 can also provide for all or a portion of the computing devices 1330 to function as a transaction handler (herein referred to as transaction handler 1330). The transaction handler 1330 can use computing and communication technology to perform function 1362, which can include among other things, processing of transaction requests among entitles described by processes 1100 of FIG. 11 and/or by processes 1000 of FIG. 10. For instance, the function 1362 of the transaction handler 1330 can be similar to the functions described for the transaction handlers 112, 218, 316, 406 of FIGS. 1-4 in accordance with the processes 1100 of FIG. 11 and/or 1000 of FIG. 10. The media processors 1306 and wireless communication devices 1316 can be provisioned with software functions 1364 and 1366, respectively, to utilize the services of the transaction handler 1330. For instance, functions 1364 and 1366 of media processors 1306 and wireless communication devices 1316 can be similar to the functions described for the user devices 318 of FIG. 3 in accordance with processes 1100 of FIG. 11 and/or 1000 of FIG. 10.

Multiple forms of media services can be offered to media devices over landline technologies such as those described above. Additionally, media services can be offered to media devices by way of a wireless access base station 1317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 14:
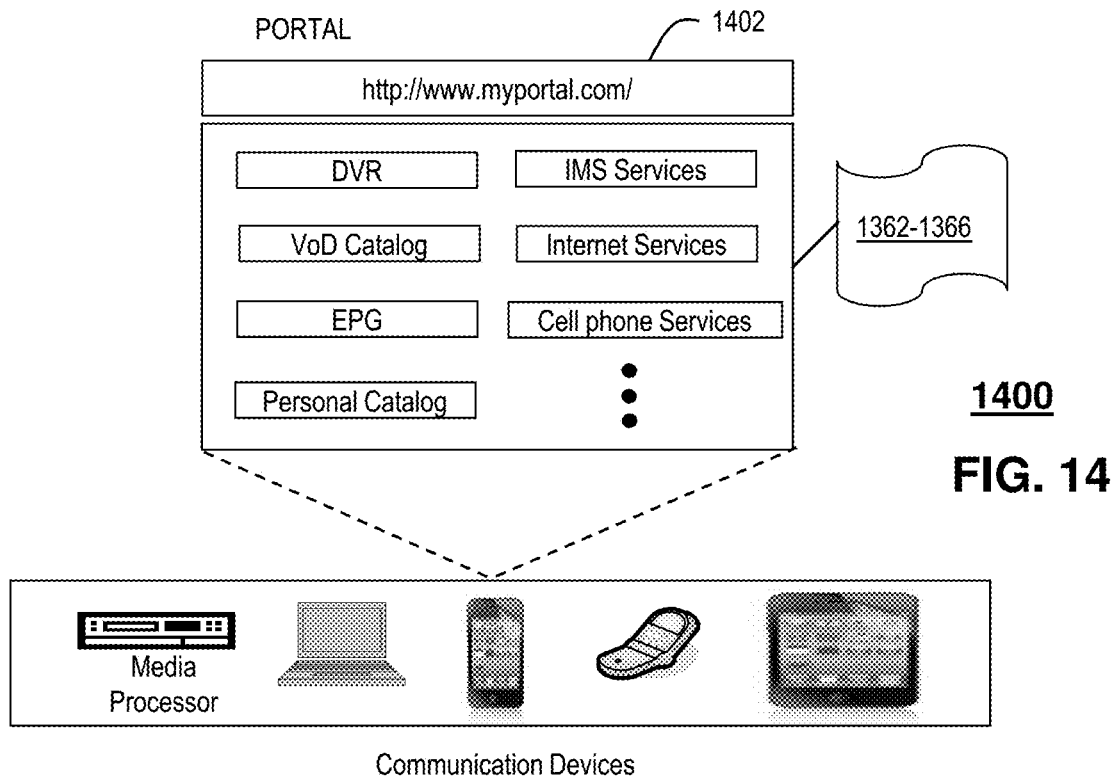
FIG. 14 depicts an illustrative embodiment of a web portal for interacting with the systems and architecture described in FIGS. 1-10, and communication systems of FIG. 13.

FIG. 14 depicts an illustrative embodiment of a web portal 1402 of a communication system 1400. Communication system 1400 can be overlaid or operably coupled with the systems and architecture described in FIGS. 1-8, and/or the communication system 1300 of FIG. 13, as another representative embodiment of the systems and architecture described in FIGS. 1-8, and/or the communication system 1300. The web portal 1402 can be used for managing services of one or more of the systems and architecture described in FIGS. 1-8 and communication systems 1300-1400. A web page of the web portal 1402 can be accessed by a Uniform Resource Locator (URL) with an Internet browser using an Internet-capable communication device such as those described in FIG. 13. The web portal 1402 can be configured, for example, to access a media processor 1306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1306. The web portal 1402 can also be used for provisioning IMS services described earlier, provisioning Internet services, provisioning cellular phone services, and so on.

The web portal 1402 can further be utilized to manage and provision software applications 1362-1366, and 1472-1474 to adapt these applications as may be desired by subscribers and/or service providers of one or more of the systems and architecture described in FIGS. 1-8, and communication systems 1300 of FIG. 13. For instance, users of the services provided by the ACS components 302 or the transaction handler 1330 can log into their on-line accounts and provision the resources with editing of one or more of topics, topic registries, rich entities, manifest files, content, rules polices, and so on. Service providers can log onto an administrator account to provision, monitor and/or maintain the systems and architecture described in FIGS. 1-8 and/or the transaction handler 1330 of FIG. 13.

Figure 15:
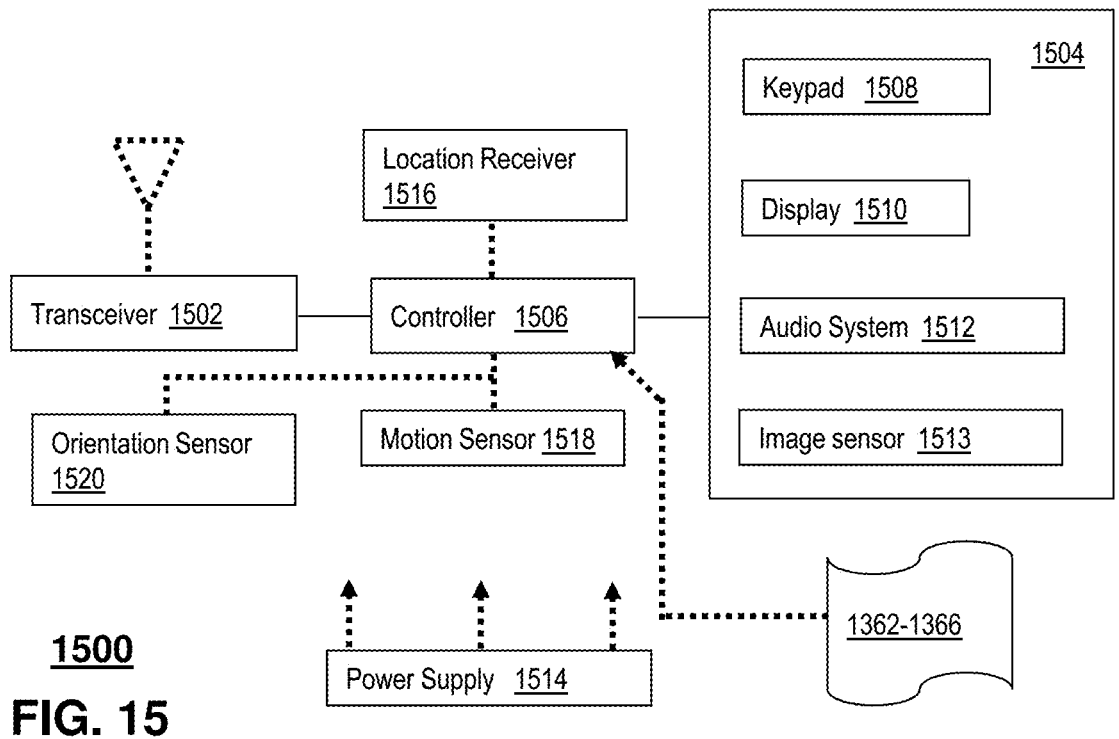
FIG. 15 depicts an illustrative embodiment of a communication device.

FIG. 15 depicts an illustrative embodiment of a communication device 1500. Communication device 1500 can serve in whole or in part as an illustrative embodiment of the devices depicted in the systems and architecture described in FIGS. 1-8, and FIG. 15 and can be configured to perform portions of the process 1100 of FIG. 11 and/or process 1000 of FIG. 10.

Communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface with graphical user interface (GUI) elements that can be selected by a user with a touch of a finger. The touch screen display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable applications. Alternatively, or in combination, the charging system can utilize external power sources such as DC power supplied over a physical interface such as a USB port or other suitable tethering technologies.

The location receiver 1516 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a reset button (not shown). The reset button can be used to reset the controller 1506 of the communication device 1500. In yet another embodiment, the communication device 1500 can also include a factory default setting button positioned, for example, below a small hole in a housing assembly of the communication device 1500 to force the communication device 1500 to re-establish factory settings. In this embodiment, a user can use a protruding object such as a pen or paper clip tip to reach into the hole and depress the default setting button. The communication device 1500 can also include a slot for adding or removing an identity module such as a Subscriber Identity Module (SIM) card. SIM cards can be used for identifying subscriber services, executing programs, storing subscriber data, and so forth.

The communication device 1500 as described herein can operate with more or less of the circuit components shown in FIG. 15. These variant embodiments can be used in one or more embodiments of the subject disclosure.

The communication device 1500 can be adapted to perform the functions of devices of the systems and architecture described in FIGS. 1-8, the media processor 1306, the media devices 1308, or the portable communication devices 1316 of FIG. 13. It will be appreciated that the communication device 1500 can also represent other devices that can operate in the systems and architecture described in FIGS. 1-8, and/or the communication system 1300 of FIG. 13, such as a gaming console and a media player. In addition, the controller 1506 can be adapted in various embodiments to perform the functions 1362-1366, respectively.

Upon reviewing the aforementioned embodiments, it would be evident to an artisan with ordinary skill in the art that said embodiments can be modified, reduced, or enhanced without departing from the scope of the claims described below. For example, in some embodiments, a full digitalization of all actors in a virtual reality service ecosystem enables the actors to be available in a constant and persistent manner. Indeed, the digital representations of the actors are available even when the real entities being represented digitally are not available. Actors can include inanimate objects, such as things in a context of the Internet of Things (IoT). In some embodiments, actors can engage in multiple transactions simultaneously. In some embodiments, emulation of real world experiences related to service delivery are supported by a human language driven, ad-hoc service provisioning to create a conversational user experience between the actors and the services engaged. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 16:
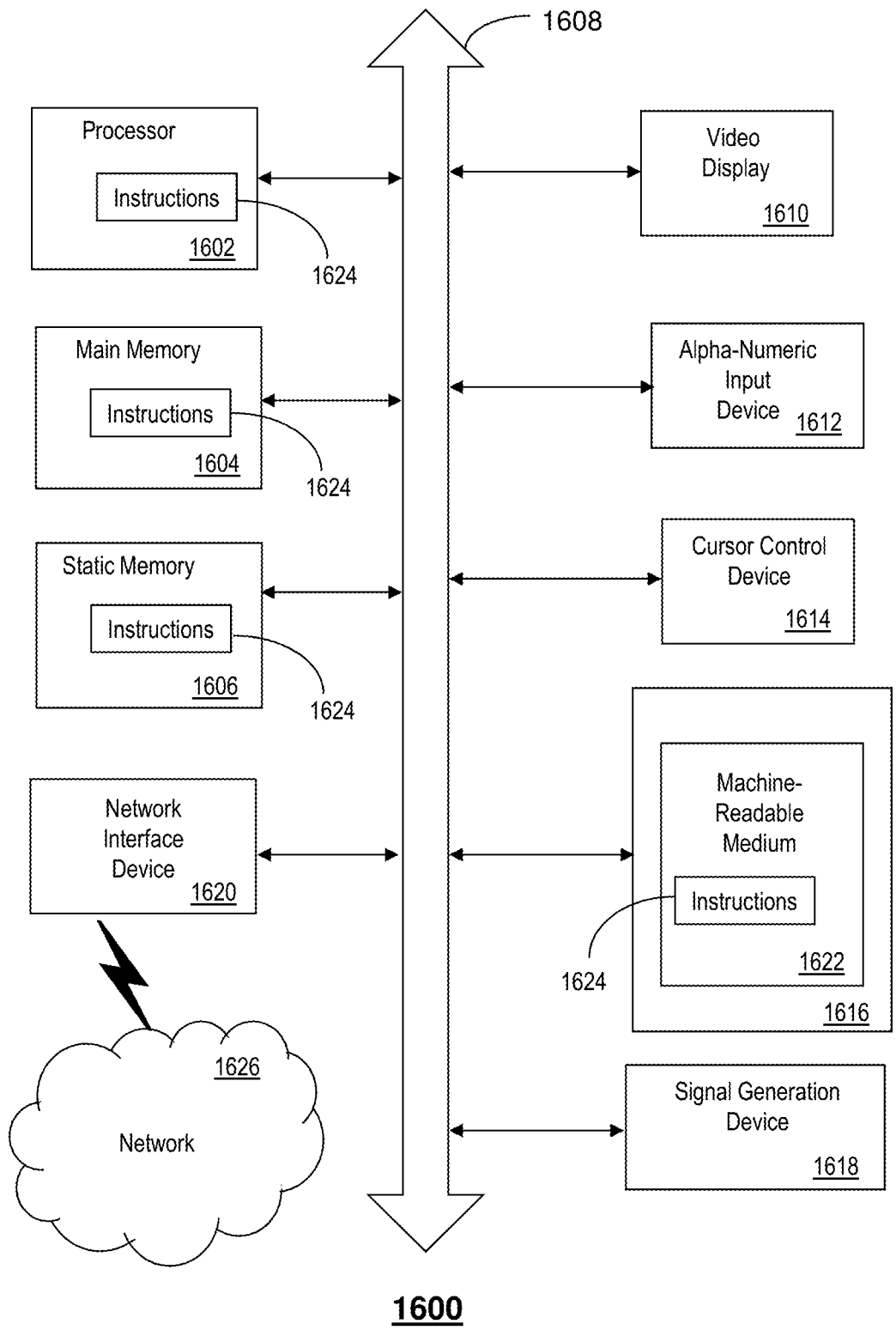
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can operate, for example, as the transaction handler 112, 218, 316, 406, 522, 1330, the topic registry 114, 204, 310, any of the exposure layer 502, the integration layer 504 and/or the resource layer 506 entities and other devices of FIGS. 1-8 and 10-13. In some embodiments, the machine may be connected (e.g., using a network 1626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor (or controller) 1602 (e.g., a central processing unit (CPU)), a graphics processing unit (GPU, or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    identifying, by a processing system including a processor, a standardized digital index comprising a plurality of data fields that accommodate a plurality of differentiating features according to a standardized taxonomic structure, wherein the plurality of data fields comprise a topic label data field, a resource data field and a manifest data field that identifies a transaction handler of a plurality of resources of the resource data field to obtain an identified transaction handler and a transaction rule, the transaction rule being implemented by the transaction handler adapted to facilitate a digital transaction between actors;
    determining, by a processing system including a processor, a differentiating feature;
    modifying, by the processing system, the standardized digital index based on the differentiating feature to obtain an entity capsule;
    storing, by the processing system, the entity capsule in an entity repository, wherein the entity capsule is accessible to support the digital transaction according to the transaction rule, within a network service provider ecosystem comprising a plurality of differentiated network services, and wherein the entity capsule supports the digital transaction as one of a user, a consumer, a producer, content, capabilities and any combination thereof; and
    determining, by the processing system, a plurality of subtopics within a digital domain, wherein the plurality of subtopics are associated with a topic of the topic label data field, wherein the topic and the plurality of subtopics share a resource of a plurality of resources listed in the manifest data field, and wherein a subtopic digital entity capsule includes a subtopic manifest data field, wherein the subtopic manifest data field comprises portions of the plurality of resources listed in the manifest data field that pertain to the subtopic of the plurality of subtopics.

2. The method of claim 1, wherein the producer and the consumer comprise digital personas representing real-world entities within a digital domain of the network service provider ecosystem.

3. The method of claim 1, wherein a resource indexed by the resource data field is selected from a group consisting of histories, subscriptions, owned content, capabilities and any combination thereof.

4. The method of claim 1, wherein the resource data field comprises a plurality of pointers that identify locations of a plurality of resources.

5. The method of claim 4, wherein the manifest data field comprises the plurality of pointers.

6. A device, comprising:
    a processing system including a processor; and
    a memory that stores executable instructions that, when executed by the processing system, facilitate performance of operations, the operations comprising:
    identifying a standardized data object comprising a plurality of data fields that accommodate a plurality of differentiating features according to a standardized taxonomic structure, wherein the plurality of data fields comprise a topic label data field, a resource data field and a manifest listing that identifies a transaction handler of a plurality of resources to obtain an identified transaction handler of the resource data field and a transaction rule, the transaction rule being implemented by the identified transaction handler adapted to facilitate a digital transaction between actors;

determining a differentiating information item;
modifying the standardized data object based on the differentiating information item to obtain an entity object;
storing the entity object in an entity repository, wherein the entity object is accessible to support a digital transaction according to the transaction rule, within a network service provider ecosystem comprising a plurality of differentiated network services, and wherein the entity object supports the digital transaction as one of a user, a consumer, a producer, content, capabilities and any combination thereof; and
determining a plurality of subtopics within a digital domain, wherein the plurality of subtopics are associated with a topic of the topic label data field, wherein the topic and the plurality of subtopics share the resource of the resource data field listed in the manifest listing, and wherein a subtopic digital entity includes a subtopic manifest data item comprising a portion of the manifest listing that pertains to the subtopic of the plurality of subtopics.

7. The device of claim 6, wherein the producers and the consumers comprise digital personas representing real-world entities within a digital domain of the network provider service ecosystem.

8. The device of claim 6, wherein the resource of the resource data field is selected from a group consisting of histories, subscriptions, owned content, capabilities and any combination thereof.

9. The device of claim 6, wherein the entity object comprises information of the resource of the resource data field.

10. The device of claim 6, wherein the manifest listing comprises a plurality of pointers that identify locations of a plurality of resources.

11. A non-transitory, machine-readable storage medium, comprising executable instructions that, when executed by a processing system including a processor, facilitate performance of operations, the operation comprising:
determining a differentiating information item;
modifying a standardized digital index based on the differentiating information item to obtain an entity, wherein the standardized digital index comprises a plurality of data fields that accommodate a plurality of differentiating information items according to a standardized taxonomic structure, wherein the plurality of data fields comprise a topic label, a resource and a manifest listing that identifies the resource comprising a transaction handler to obtain an identified transaction handler and a transaction rule, the transaction rule being implemented by the identified transaction handler adapted to facilitate a digital transaction between actors;
storing the entity in an entity repository, wherein the entity is accessible to support a digital transaction according to the transaction rule, within a network service provider ecosystem comprising a plurality of differentiated network services, and wherein the entity supports the digital transaction as one of a user, a consumer, a producer, content, capabilities and any combination thereof; and
determining a plurality of subtopics within a digital domain, wherein the plurality of subtopics are associated with a topic of the topic label, wherein the topic and the plurality of subtopics share the resource indicated in the manifest listing, and wherein a subtopic rich entity descriptor includes a subtopic manifest listing comprising a portion of the manifest listing that pertains to the subtopic of the plurality of subtopics.

12. The non-transitory, machine-readable storage medium of claim 11, wherein the producers and the consumers comprise digital personas representing real-world entities within a digital domain of the network service provider ecosystem.

13. The non-transitory, machine-readable storage medium of claim 11, wherein the resource is selected from a group consisting of histories, subscriptions, owned content, capabilities, and any combination thereof.

14. The non-transitory, machine-readable storage medium of claim 11, wherein the manifest listing comprises a pointer that identifies a location of the resource.

15. The method of claim 2, wherein the digital personas persist within the digital domain by way of entity capsules of a plurality of entity capsules stored in the entity repository to engage in the digital transaction, independent of availabilities of the real-world entities.

16. The method of claim 3, wherein the digital transaction comprises an exchange of the owned content.

17. The device of claim 7, wherein the digital personas persist within the digital domain to engage in the digital transaction, independent of availabilities of the real-world entities.

18. The device of claim 9, wherein a pointer of a plurality of pointers identifies a location of the information.

19. The non-transitory, machine-readable storage medium of claim 12, wherein the digital personas persist within a digital domain to engage in the digital transaction, independent of availabilities of the real-world entities.

20. The non-transitory, machine-readable storage medium of claim 14, wherein the manifest listing comprises a pointer that identifies a location of the resource.

* * * * *